(12) United States Patent
Horn et al.

(10) Patent No.: US 11,477,064 B2
(45) Date of Patent: Oct. 18, 2022

(54) TECHNIQUES FOR TRANSMITTING DEMODULATION REFERENCE SIGNALS USING NONCOHERENT MODULATION

(71) Applicant: QUALCOMM Incorporated, San Diego, CA (US)

(72) Inventors: Idan Michael Horn, Hod Hasharon (IL); Michael Levitsky, Rehovot (IL); Assaf Touboul, Netanya (IL); Gideon Shlomo Kutz, Ramat Hasharon (IL); Amit Bar-Or Tillinger, Tel-Aviv (IL); Shay Landis, Hod Hasharon (IL); Guy Wolf, Rosh Haayin (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/016,793

(22) Filed: Sep. 10, 2020

(65) Prior Publication Data
US 2022/0078058 A1    Mar. 10, 2022

(51) Int. Cl.
*H04L 27/233* (2006.01)
*H04J 13/18* (2011.01)
(Continued)

(52) U.S. Cl.
CPC ......... *H04L 27/2331* (2013.01); *H04J 13/18* (2013.01); *H04L 5/0051* (2013.01);
(Continued)

(58) Field of Classification Search
None
See application file for complete search history.

(56) References Cited

U.S. PATENT DOCUMENTS

2014/0044057 A1\* 2/2014 Gaal .............. H04L 5/0053
                                                        370/329
2018/0123849 A1\* 5/2018 Si .................. H04L 27/2613
(Continued)

FOREIGN PATENT DOCUMENTS

WO    WO-2019027360 A1 \* 2/2019

OTHER PUBLICATIONS

Huawei, et al., "Design of DL DMRS for Data Transmission", 3GPP TSG RAN WG1 Meeting #88, 3GPP Draft; R1-1701692, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 17, 2017 (Feb. 17, 2017), 5 Pages, XP051208858, Retrieved from the Internet: URL: http://www.3gpp.org/ftp/Meetings_3GPP_SYNC/RAN1/Docs/, Sections 1-3, [retrieved on Feb. 12, 2017] the whole document.

(Continued)

*Primary Examiner* — Diane L Lo
(74) *Attorney, Agent, or Firm* — Dalei Dong; Holland & Hart LLP

(57) ABSTRACT

Techniques for wireless communications are described. A demodulation reference signal generated using user information and a noncoherent modulation technique may be communicated between wireless devices. A data sequence may be extracted from the demodulation reference signal based on demodulating the demodulation reference signal using the noncoherent modulation technique and decoding the demodulation reference signal. The data sequence may be used to reconstruct a version of the demodulation reference signal used to descramble a received version of the demodulation reference signal. The descrambled demodulation reference signal may be used to estimate a data (Continued)

channel between a transmitting device and a receiving device.

30 Claims, 11 Drawing Sheets

(51) Int. Cl.
    *H04L 5/00*      (2006.01)
    *H04L 5/10*      (2006.01)
    *H04L 27/26*      (2006.01)

(52) U.S. Cl.
    CPC ............ *H04L 5/10* (2013.01); *H04L 27/2607* (2013.01); *H04L 27/2613* (2013.01)

(56) References Cited

U.S. PATENT DOCUMENTS

| | | | |
|---|---|---|---|
| 2019/0159181 A1 | 5/2019 | Manolakos et al. | |
| 2021/0119751 A1* | 4/2021 | Mundarath | H04W 72/02 |

OTHER PUBLICATIONS

Intel Corporation: "Receiver Structure and Channel Estimation Algorithm for NOMA", 3GPP Draft, R1-1806532, 3GPP TSG RAN WG1 Meeting #93, INTEL—NOMA RX, 3rd Generation Partnership Project (3GPP), Mobile Competence Centre, 650, Route Des Lucioles, F-06921 Sophia-Antipolis Cedex, France, vol. RAN WG1. No. Busan. Korea, May 21, 2018-May 25, 2018, May 20, 2018 (May 20, 2018), XP051441734, pp. 1-8, Retrieved from the Internet: URL:http://www.3gpp.org/ftp/Meetings%5F3GPP%5FSYNC/RAN1/Docs/ [retrieved on May 20, 2018] Sections 1, 2.
International Search Report and Written Opinion—PCT/US2021/045156—ISA/EPO—dated Nov. 25, 2021.
Mediatek Inc: "Remaining Details on PBCH-DMRS/Data Scrambling and PBCH Contents", 3GPP Draft, 3GPP TSG RAN WG1 Meeting NR#3, R1-1716204_Remaining Details on PBCH-DMRS/Data Scrambling and PBCH Contents, 3rd Generation Partnership Project (3GPP), Mobile Competence Centre, 650, Route Des Lucioles, F-06921 SOP, vol. RAN WG1. No. Nagoya. Japan, Sep. 18, 2017-Sep. 21, 2017, Sep. 17, 2017 (Sep. 17, 2017-), XP051339662, 5 Pages, Retrieved from the Internet: URL:http://www.3gpp.org/ftp/Meetings_3GPP_SYNC/RAN1/Docs/ retrieved on Sep. 17, 2017] Section 3.

\* cited by examiner

TECHNIQUES FOR TRANSMITTING DEMODULATION REFERENCE SIGNALS USING NONCOHERENT MODULATION

FIELD OF TECHNOLOGY

The following relates to wireless communications, including techniques for transmitting demodulation reference signals using noncoherent modulation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

To support wireless communications, reference signals (e.g., demodulation reference signals (DMRSs), tracking reference signals (TRSs), etc.) may be transmitted between wireless devices. The wireless device may use the reference signals to estimate characteristics of a wireless channel between the wireless devices.

SUMMARY

The described techniques relate to improved techniques for transmitting demodulation reference signals using noncoherent modulation. A demodulation reference signal generated using user information and a noncoherent modulation technique may be communicated between wireless devices. A data sequence may be extracted from the demodulation reference signal based on demodulating the demodulation reference signal using the noncoherent modulation technique and decoding the demodulation reference signal. The data sequence may be used to reconstruct a version of the demodulation reference signal used to descramble a received version of the demodulation reference signal. The descrambled demodulation reference signal may be used to estimate a data channel between a transmitting device and a receiving device.

A method of wireless communication at a receiving device is described. The method may include receiving a demodulation reference signal including a set of modulated symbols, the demodulation reference signal configured to convey user data, demodulating, using differential demodulation, the set of modulated symbols to obtain a set of demodulated symbols, generating a data sequence based on the set of demodulated symbols, the data sequence including user data for the receiving device, descrambling the demodulation reference signal based on the generated data sequence, and estimating a physical downlink shared channel based on the descrambled demodulation reference signal.

An apparatus for wireless communication at a receiving device is described. The apparatus may include a processor, memory coupled with the processor, and instructions stored in the memory. The instructions may be executable by the processor to cause the apparatus to receive a demodulation reference signal including a set of modulated symbols, the demodulation reference signal configured to convey user data, demodulate, using differential demodulation, the set of modulated symbols to obtain a set of demodulated symbols, generate a data sequence based on the set of demodulated symbols, the data sequence including user data for the receiving device, descramble the demodulation reference signal based on the generated data sequence, and estimate a physical downlink shared channel based on the descrambled demodulation reference signal.

Another apparatus for wireless communication at a receiving device is described. The apparatus may include means for receiving a demodulation reference signal including a set of modulated symbols, the demodulation reference signal configured to convey user data, demodulating, using differential demodulation, the set of modulated symbols to obtain a set of demodulated symbols, generating a data sequence based on the set of demodulated symbols, the data sequence including user data for the receiving device, descrambling the demodulation reference signal based on the generated data sequence, and estimating a physical downlink shared channel based on the descrambled demodulation reference signal.

A non-transitory computer-readable medium storing code for wireless communication at a receiving device is described. The code may include instructions executable by a processor to receive a demodulation reference signal including a set of modulated symbols, the demodulation reference signal configured to convey user data, demodulate, using differential demodulation, the set of modulated symbols to obtain a set of demodulated symbols, generate a data sequence based on the set of demodulated symbols, the data sequence including user data for the receiving device, descramble the demodulation reference signal based on the generated data sequence, and estimate a physical downlink shared channel based on the descrambled demodulation reference signal.

In some examples of the method, apparatuses, and non-transitory computer-readable medium described herein, descrambling the demodulation reference signal based on the generated data sequence may include operations, features, means, or instructions for encoding the generated data sequence to obtain a second data sequence, and modulating the second data sequence using differential modulation to obtain a second set of modulated symbols, where the demodulation reference signal may be descrambled using the second set of modulated symbols.

In some examples of the method, apparatuses, and non-transitory computer-readable medium described herein, generating the data sequence may include operations, features, means, or instructions for decoding the set of demodulated symbols to obtain the data sequence, and checking the data sequence for errors based on a set of cyclic redundancy check bits included in the data sequence.

In some examples of the method, apparatuses, and non-transitory computer-readable medium described herein, the set of demodulated symbols may be decoded in accordance with a low density parity check code, a turbo code, a polar code, or a convolutional code.

Some examples of the method, apparatuses, and non-transitory computer-readable medium described herein may further include operations, features, means, or instructions for transmitting acknowledgment feedback for the data sequence indicating whether errors were detected in the data sequence based on the set of cyclic redundancy check bits.

Some examples of the method, apparatuses, and non-transitory computer-readable medium described herein may further include operations, features, means, or instructions for demodulating a second demodulation reference signal including a second set of demodulated symbols that may be a repetition of the set of demodulated symbols based on transmitting acknowledgment feedback indicating that an error was detected in the data sequence.

Some examples of the method, apparatuses, and non-transitory computer-readable medium described herein may further include operations, features, means, or instructions for receiving a first component of the demodulation reference signal transmitted from a first antenna port using communication resources and a second component of the demodulation reference signal transmitted from a second antenna port using the same communication resources.

In some examples of the method, apparatuses, and non-transitory computer-readable medium described herein, the first component of the demodulation reference signal may include operations, features, means, or instructions for extracting the first data from the first component of the demodulation reference signal and the second data from the second component of the demodulation reference signal, where the data sequence includes the first data and the second data.

In some examples of the method, apparatuses, and non-transitory computer-readable medium described herein, the first component of the demodulation reference signal may include operations, features, means, or instructions for extracting the first data from the first component of the demodulation reference signal and the second component of the demodulation reference signal, where the data sequence includes the first data.

Some examples of the method, apparatuses, and non-transitory computer-readable medium described herein may further include operations, features, means, or instructions for separating the first component of the demodulation reference signal from the second component of the demodulation reference signal based on a set of orthogonal cover codes.

Some examples of the method, apparatuses, and non-transitory computer-readable medium described herein may further include operations, features, means, or instructions for receiving, using a second set of communication resources, a data signal including a second set of modulated symbols.

In some examples of the method, apparatuses, and non-transitory computer-readable medium described herein, the set of modulated symbols of the demodulation reference signal may be demodulated using differential phase shift keying and the second set of modulated symbols of the data signal may be demodulated using coherent demodulation.

Some examples of the method, apparatuses, and non-transitory computer-readable medium described herein may further include operations, features, means, or instructions for demodulating, using coherent modulation, the second set of modulated symbols received in the data signal to obtain a second set of demodulated symbols based on the estimated physical downlink shared channel, generating a second data sequence based on the second set of demodulated symbols, and combining the data sequence and the second data sequence to obtain a combined data sequence.

Some examples of the method, apparatuses, and non-transitory computer-readable medium described herein may further include operations, features, means, or instructions for checking the combined data sequence for errors based on a set of cyclic redundancy check bits included in the combined data sequence.

Some examples of the method, apparatuses, and non-transitory computer-readable medium described herein may further include operations, features, means, or instructions for receiving a first indication of a difference between a first modulation and coding scheme level used for the demodulation reference signal and a second modulation and coding scheme level used for the data signal, a second indication of a maximum modulation and coding scheme level for the demodulation reference signal, a third indication that a communication mode that supports demodulation reference signals carrying data may be enabled, or any combination thereof.

In some examples of the method, apparatuses, and non-transitory computer-readable medium described herein, the first indication, the second indication, the third indication, or any combination thereof may be received in downlink control information, radio resource control information, or any combination thereof.

Some examples of the method, apparatuses, and non-transitory computer-readable medium described herein may further include operations, features, means, or instructions for transmitting a first indication of a difference between a first modulation and coding scheme level used for the demodulation reference signal and a second modulation and coding scheme level used for the data signal, a second indication of a maximum modulation and coding scheme level for the demodulation reference signal, a third indication that a communication mode that supports demodulation reference signals carrying data may be enabled, or any combination thereof.

Some examples of the method, apparatuses, and non-transitory computer-readable medium described herein may further include operations, features, means, or instructions for receiving, after the demodulation reference signal, a second demodulation reference signal in the time interval, the second demodulation reference signal including a pseudorandom sequence.

Some examples of the method, apparatuses, and non-transitory computer-readable medium described herein may further include operations, features, means, or instructions for determining that the demodulation reference signal carries data based on one or more channel characteristics exceeding a threshold.

A method of wireless communication at a transmitting device is described. The method may include identifying a data sequence for transmission to a receiving device, generating, using differential modulation, a first set of modulated symbols based on the data sequence, and transmitting a demodulation reference signal including the first set of modulated symbols.

An apparatus for wireless communication at a transmitting device is described. The apparatus may include a processor, memory coupled with the processor, and instructions stored in the memory. The instructions may be executable by the processor to cause the apparatus to identify a data sequence for transmission to a receiving device, generate, using differential modulation, a first set of modulated symbols based on the data sequence, and transmit a demodulation reference signal including the first set of modulated symbols.

Another apparatus for wireless communication at a transmitting device is described. The apparatus may include means for identifying a data sequence for transmission to a receiving device, generating, using differential modulation, a first set of modulated symbols based on the data sequence, and transmitting a demodulation reference signal including the first set of modulated symbols.

A non-transitory computer-readable medium storing code for wireless communication at a transmitting device is described. The code may include instructions executable by a processor to identify a data sequence for transmission to a receiving device, generate, using differential modulation, a first set of modulated symbols based on the data sequence, and transmit a demodulation reference signal including the first set of modulated symbols.

Some examples of the method, apparatuses, and non-transitory computer-readable medium described herein may further include operations, features, means, or instructions for encoding a portion of the data sequence in accordance with a low density parity check code, a turbo code, a polar code, or a convolutional code, where the first set of modulated symbols may be obtained based on the encoded portion of the data sequence.

Some examples of the method, apparatuses, and non-transitory computer-readable medium described herein may further include operations, features, means, or instructions for generating a set of cyclic redundancy check bits based on a portion of the data sequence used to generate the first set of modulated symbols, where the first set of modulated symbols includes the portion of the data sequence and the set of cyclic redundancy check bits.

Some examples of the method, apparatuses, and non-transitory computer-readable medium described herein may further include operations, features, means, or instructions for receiving acknowledgment feedback indicating that an error was detected in a second data sequence conveyed by the demodulation reference signal based on the set of cyclic redundancy check bits, and transmitting a second demodulation reference signal including a second set of modulated symbols including the portion of the data sequence and the set of cyclic redundancy check bits.

In some examples of the method, apparatuses, and non-transitory computer-readable medium described herein, transmitting the demodulation reference signal may include operations, features, means, or instructions for transmitting, using a first antenna port, a first component of the demodulation reference signal over communication resources in accordance with a first orthogonal cover code of a set of orthogonal cover codes, and transmitting, using a second antenna port, a second component of the demodulation reference signal over the same communication resources in accordance with a second orthogonal cover code of the set of orthogonal cover codes.

In some examples of the method, apparatuses, and non-transitory computer-readable medium described herein, transmitting the demodulation reference signal may include operations, features, means, or instructions for transmitting the first component of the demodulation reference signal over a first spatial layer, the first component of the demodulation reference signal including a first portion of the data sequence, and transmitting the second component of the demodulation reference signal over a second spatial layer, the second component of the demodulation reference signal including a second portion of the data sequence.

Some examples of the method, apparatuses, and non-transitory computer-readable medium described herein may further include operations, features, means, or instructions for generating, using coherent modulation, a second set of modulated symbols based on the data sequence, and transmitting, concurrently with the demodulation reference signal, a data signal including the second set of modulated symbols, where the demodulation reference signal may be transmitted in accordance with a first modulation and coding scheme level and the data signal may be transmitted in accordance with a second modulation and coding scheme level.

DETAILED DESCRIPTION

Figure 1:
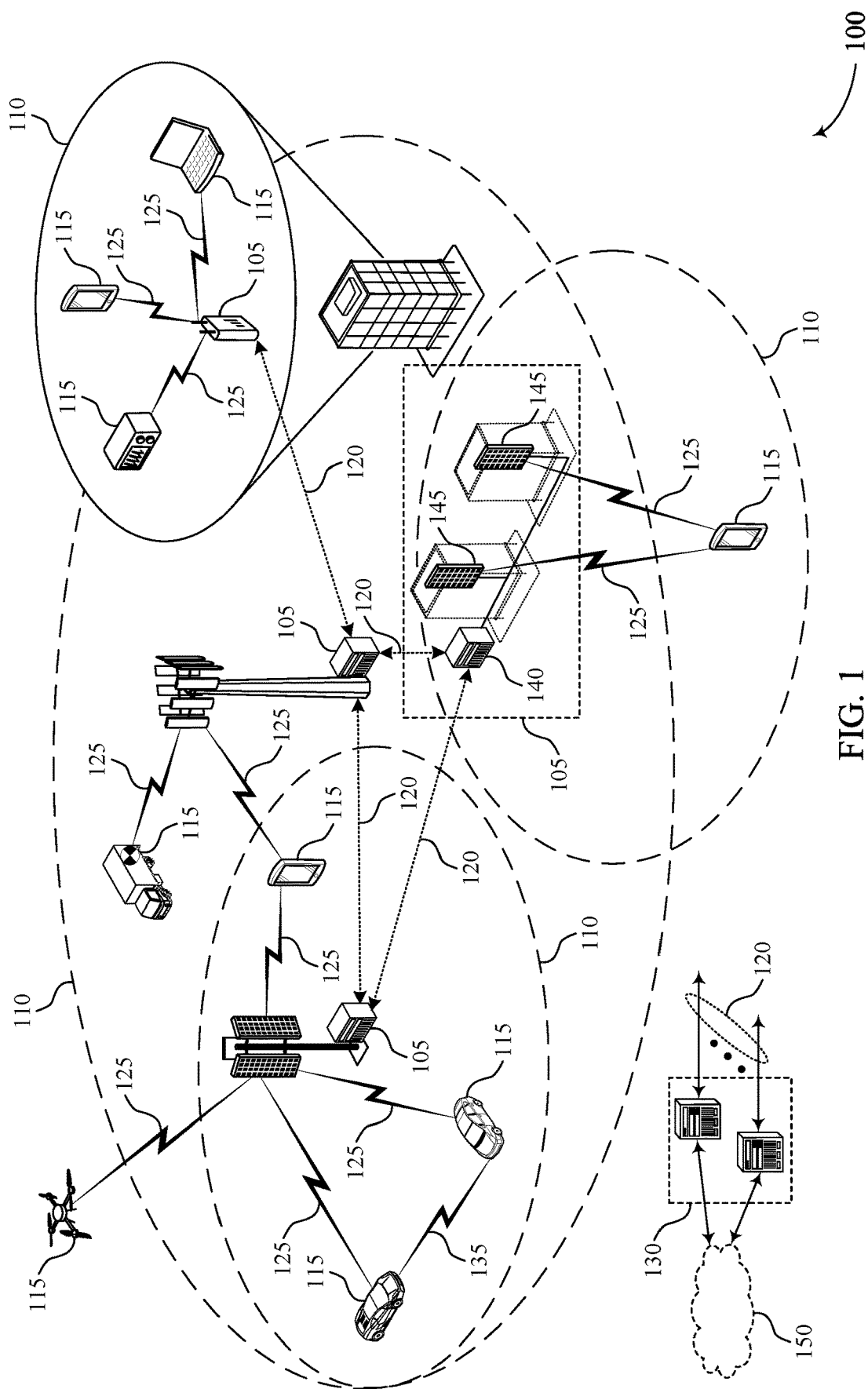
FIG. 1 illustrates an example of a system for wireless communications that supports techniques for transmitting demodulation reference signals using noncoherent modulation in accordance with various aspects of the present disclosure.

Coherent modulation techniques (e.g., quadrature phase shift keying (QPSK) modulation and quadrature amplitude modulation (QAM)) may be used to communicate information within a wireless communications system. Coherent modulation techniques rely on a common phase reference between a transmitting device and a receiving device to enable a receiving device to reliably determine a phase of a signal transmitted from the transmitting device. To maintain a common phase reference, reference signals may be transmitted between a transmitting device and receiving device. By contrast noncoherent modulation techniques (e.g., differential phase shift keying (DPSK)) may be used to communicate information within a wireless communications system without the maintenance of a common phase reference.

A demodulation reference signal (DMRS) may be transmitted to support time domain equalization and channel estimation for data communications that use a coherent modulation technique and are received at a receiving device. In some examples, a DMRS is transmitted using a set of resources that is divided into subsets of resources (which may be referred to as code division multiplexed (CDM) groups). In such cases, a DMRS may include multiple DMRS components transmitted from multiple antenna ports, where one or more of the multiple DMRS components may be transmitted over one CDM group in accordance with an available set of orthogonal codes. A DMRS may be generated using a pseudorandom sequence that is known to a transmitting and receiving device. The pseudorandom sequence may be determined based on a slot number within a radio frame and a unique identifier (e.g., a downlink DMRS scrambling identifier or a cell identifier). In some examples, each DMRS component transmitted using a CDM group is generated using the same pseudorandom sequence. A receiving device may use the known pseudorandom sequence to descramble a received DMRS and to determine characteristics (e.g., amplitude and phase information) of a channel over which a DMRS component was transmitted.

Since a pseudorandom sequence is used to generate a DMRS, the pseudorandom sequence may not convey system or user information to a receiving device. Also, in some examples, up to four DMRSs may be transmitted to support a single data transmission—e.g., a data transmission that extends twelve symbol periods. Thus, depending on the length and number of the DMRSs transmitted, an amount of resources allocated to DMRS transmissions may introduce a significant amount of overhead into a data transmission, reducing a throughput of wireless communications. For example, if four DMRSs are transmitted over a set of resources spanning one symbol period, around 33.3% of a data transmission may be dedicated to signaling overhead.

To reduce the amount of signaling overhead created by DMRS transmissions, techniques for transmitting DMRSs that include data may be used. Also, to enable the reliable decoding of the data included in DMRS transmissions, a noncoherent modulation technique may be used to modulate and demodulate DMRS transmissions. In some examples, a wireless device receives a DMRS that was generated using a set of information bits (e.g., user data or system information) and modulated using differential modulation. The receiving device may demodulate, using a differential demodulation, the DMRS to obtain one or more demodulated symbols and may generate a data sequence from the one or more demodulated symbols. The receiving device may use the generated data sequence to descramble the received DMRS. For example, the receiving device may encode the generated data sequence using an encoding scheme used by the transmitting device to encode the DMRS and modulate the encoded data sequence using differential modulation to obtain a signal that is similar to (or matches) the DMRS transmitted from the transmitting device. The receiving device may then use the reconstructed DMRS signal to isolate one or more components of the received DMRS, and use the one or more components to determine information that supports time domain equalization and/or channel estimation.

By including data in a DMRS transmission, a throughput of communications between wireless devices may be increased. Also, by using a noncoherent modulation technique to modulate and demodulate DMRS transmissions, DMRS transmissions may be reliably decoded without introducing or using a different reference signal to support decoding DMRS transmissions that carry data.

Aspects of the disclosure are initially described in the context of wireless communications systems. Aspects of the disclosure are also described in the context of an operating diagram and process flow. Aspects of the disclosure are further illustrated by and described with reference to apparatus diagrams, system diagrams, and flowcharts that relate to techniques for transmitting demodulation reference signals using noncoherent modulation.

FIG. 1 illustrates an example of a system for wireless communications that supports techniques for transmitting demodulation reference signals using noncoherent modulation in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or another network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at designated orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a designated orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A wireless communications system 100 may support multiple types of modulation techniques for conveying data between transmitting and receiving devices. Different types of modulation techniques may map logic values to different sets of modulation symbols, where each modulated symbol may be associated with a unique amplitude and/or phase. The different techniques may include coherent and/or non-coherent modulation techniques. For a coherent modulation technique, each modulated symbol may be associated with a respective amplitude and a respective phase (e.g. one of 0, 90, 180, or 270 degrees). Also, for a coherent modulation technique, a transmitting device and a receiving device may keep track of a common phase reference so that a phase determined by a receiving device for a received modulated symbol corresponds to the phase used by a transmitting device to transmit the modulated symbol. In some examples, the transmitting device and receiving device use a phase locked loop to maintain the common phase reference and to accommodate for phase drift that may occur during operation. For a noncoherent modulation technique, each modulated symbol may be associated with a respective amplitude and a "relative phase." Thus, for a noncoherent modulation technique, a transmitting device and a receiving device may not keep track of a common phase reference—e.g., because the receiving device may use a relative phase difference between consecutive modulated symbols to determine a logic value associated with a received symbol rather than an actual phase of a received modulated symbol.

Different types of modulation techniques include phase shift keying (PSK) modulation, amplitude phase shift keying (APSK) modulation, QAM, DPSK modulation, and differential amplitude phase shift keying (DAPSK) modulation. PSK modulation and QAM may be associated with coherent modulation, while DPSK modulation may be associated with noncoherent modulation. A first set of PSK modulation techniques (which may simply be referred to as PSK modulation) may be associated with a set of modulation symbols that have a same amplitude and unique phases that are distributed across a range of available phases (e.g., across a 360 degree or $2\pi$ radian range). The first set of PSK modulation techniques may include a binary phase shift keying (BPSK) modulation technique (which may include two modulation symbols), a QPSK modulation technique (which may include four modulation symbols), 8-PSK (which may include eight modulation symbols), and so on. In some cases, an order of a modulation technique may be based on a number of modulation symbols supported by the modulation technique—e.g., QPSK may be a fourth-order modulation technique). Another set of PSK modulation techniques (which may be referred to as APSK modulation) may be associated with a first set of modulation symbols that have a first amplitude and unique phases and a second set of modulation symbols that have a different (e.g., larger) amplitude and unique phases. A QAM technique may be associated with a set of modulation symbols that have different amplitude and phase combinations and that are equidistant from one another. Different QAM techniques may include different quantities of modulation symbols (e.g., 4-QAM, 8-QAM, 16-QAM, 32-QAM, and so on). In some cases, 4-QAM may be equivalent to QPSK modulation.

A first set of DPSK modulation techniques (which may simply be referred to as DPSK modulation) may be associated with a set of modulation symbols that have a same amplitude and unique "relative phases" that are distributed across a range of available phases. Unlike PSK modulation, the actual phase associated with a DPSK symbol may change over time, while the relative phase (or a difference in phase) between DPSK symbols may remain constant. A DPSK modulated symbol may be represented as $x_k = x_{k-1} s_k$, $k \geq 0$, where $x_k$ refers to the kth modulated symbol, $x_{k-1}$ refers to the k−1th modulated symbol, and $s_k$ refers to the kth data symbol, assuming $x_{-1}=1$. A second set of DPSK modulation techniques (which may be referred to as DAPSK) may be associated with a first set of modulation symbols that have a first amplitude and unique relative phases that are distributed across a range of available phases and a second set of modulation symbols that have a second amplitude and unique relative phases that are distributed across the range of available phases.

The wireless communications system 100 may similarly support demodulation techniques for conveying data between transmitting and receiving devices. The demodulation techniques may be used to map a received set of modulated symbols to modulation symbols of a modulation constellation and to determine data values associated with the modulated symbols. Mapping the modulated symbols to the modulation constellation may involve determining an amplitude and phase of the received set of modulated symbols. A demodulated DPSK symbol may be represented as $z_k = y_k y^*_{k-1}$ where $z_k$ refers to the kth demodulated symbol, $y_k$ refers to the kth received symbol, and $y^*_{k-1}$ refers to the complex conjugate of the k−1th data symbol. The demodulated DPSK symbol may also be represented as $z_k = (h_k x_k + v_k)(h_{k-1} x_{k-1} + v_{k-1})^* \Rightarrow (h_k x_{k-1} s_k + v_k)(h_{k-1} x_{k-1} + v_{k-1})^*$, where $h_k$ refers to the channel/phase noise response and $v_k$ refers to the noise associated with the channel. Since the characteristics of the channel are unlikely to significantly change between two symbols, the channel/phase noise response between two symbols may be assumed to be the same—that is, the phase noise may be canceled. Thus, $z_k$ may be represented as $(h_k x_{k-1} s_k + v_k)(h_k x_{k-1} + v_{k-1})^*$. The minimum mean square error combining vector $\hat{m}$ may be equal to $\mathrm{argmin}_m\{|\angle z_k - \theta_m|^2\}$ and the estimated data symbol $\hat{s}_k$ may be equal to $e^{j\theta_{\hat{m}}}$. Other demodulation techniques may be used to estimated data symbol $\hat{s}_k$, including maximum likelihood decoding and iterative decoding techniques. Demodulation may be similarly performed for DAPSK symbols.

The peak-to-average power ratio (PAPR) associated with transmissions modulated using QAM may increase as the QAM order increases. For example, a transmission that uses 16-QAM may have a PAPR that is at least a decibel (dB) higher than a transmission that uses QPSK (or 4-QAM)—e.g., due to the higher amplitudes used to represent the additional modulation symbols. By contrast, the PAPR associated with transmissions using DPSK modulation may remain constant as the modulation order increases—e.g., 8-DPSK may have a same PAPR as 4-DPSK.

Reference signals may be used to support coherent modulation. For example, a phase tracking reference signal (PTRS) may be transmitted by a transmitting device and used by a receiving device to lock onto a phase reference being used by the transmitting device. Also, a DMRS may be transmitted by a transmitting device and used by a receiving device for channel estimation and time-domain equalization. A DMRS may be precoded using the same precoding matrix as a physical downlink shared channel (PDSCH) signal. In some examples, a DMRS includes multiple, orthogonalized DMRS components that are transmitted over a set of resources. In some examples, the set of resources may be divided into subsets of resources (which may be referred to as a CDM groups). Multiple components of a DMRS may be simultaneously transmitted using communication resources in a CDM group. For example, a base station 105 may transmit a first DMRS component over the CDM group resources using a first antenna port in accordance with a first orthogonal code and a second DMRS component over the CDM group resource using a second antenna port in accordance with a second orthogonal code. In some examples, a CDM group may include four or six resource elements. Thus, a UE 115 that receives the DMRS including the first and second DMRS components may separate the DMRS components to separately determine channel estimation and equalization information for the different antenna ports.

In some examples, a set of resources that spans one symbol period and is partitioned into two CDM groups may be scheduled for a DMRS transmission. In such cases, the set of resources may support the transmission of up to four DMRS components from up to four antenna ports. In other examples, the set of resources spans two symbol periods and is partitioned into two CDM groups. In such cases, the set of resources may support the transmission of up to eight DMRS components from up to eight antenna ports—e.g., each CDM resource group may support the transmission of up to four DMRS components using four different orthogonal codes. In other examples, up to twelve DMRS components may be supported—e.g., if the set of resources spans two symbol periods and is divided into three CDM groups.

In some examples, a DMRS (and the components of a DMRS) may be generated in accordance with a pseudorandom sequence. The pseudorandom sequence used for the DMRS may differ on a cell-by-cell basis and may be generated based on a cell identifier, a downlink DMRS scrambling identifier, and/or a slot number within a radio frame. Thus, no user or system data may be conveyed in a DMRS generated using a pseudorandom sequence. In some examples, a UE 115 may determine the pseudorandom sequence based on an indication of the cell identifier received from the base station 105. To perform time domain equalization and determine a channel estimate, the UE 115 may analyze a received DMRS component based on the determined pseudorandom sequence. For example, the UE 115 may generate an estimate of the DMRS signal that was transmitted from the base station based on the pseudorandom sequence (e.g., by modulating and coding the pseudorandom sequence using the same modulation and coding as the base station) and compare the estimated DMRS signal with a received DMRS component. The UE 115 may then use similarities and differences between the estimated DMRS signal and received DMRS component to determine how a channel affects amplitude and phase characteristics of a transmitted DMRS component.

Since a pseudorandom sequence is used to generate a DMRS, the pseudorandom sequence may not convey system or user information. Also, in some examples, up to four DMRSs may be transmitted to support a single data transmission—e.g., a data transmission that extends twelve symbol periods. Thus, depending on the length and number of the DMRSs transmitted, an amount of resources allocated to DMRS transmissions may introduce a significant amount of overhead into a data transmission, reducing a throughput of wireless communications. For example, if four DMRSs are transmitted over a set of resources spanning one symbol period, around 33.3% of a data transmission may be dedicated to signaling overhead.

To reduce the amount of signaling overhead created by DMRS transmissions, techniques for transmitting DMRSs that include data may be used. Also, to enable the reliable decoding of the data included in DMRS transmissions, a noncoherent modulation technique may be used to modulate and demodulate DMRS transmissions. In some examples, a wireless device receives a DMRS that was generated using a set of information bits (e.g., user data or system information) and modulated using differential modulation. The receiving device may demodulate, using a differential demodulation, the DMRS to obtain one or more demodulated symbols and may generate a data sequence from the one or more demodulated symbols. The receiving device may use the generated data sequence to descramble the received DMRS. For example, the receiving device may encode the generated data sequence using an encoding scheme used by the transmitting device to encode the DMRS and modulate the encoded data sequence using differential modulation to obtain a signal that is similar to (or matches) the DMRS transmitted from the transmitting device. The receiving device may then use the reconstructed DMRS signal to isolate one or more components of the received DMRS, and use the one or more components to determine time domain equalization and/or channel estimation information.

By including data in a DMRS transmission, a throughput of communications between wireless devices may be increased. Also, by using a noncoherent modulation technique to modulate and demodulate DMRS transmissions, DMRS transmissions may be reliably decoded without introducing or using a different reference signal to support decoding DMRS transmissions that carry data.

Figure 2:
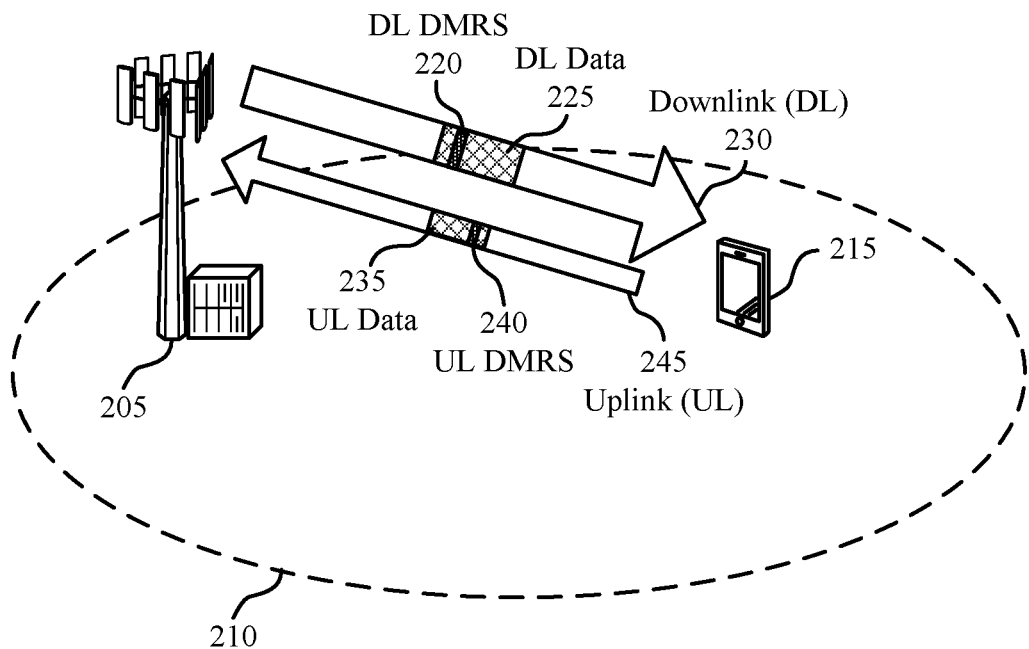
FIG. 2 illustrates an example of a wireless communications subsystem that supports techniques for transmitting demodulation reference signals using noncoherent modulation in accordance with various aspects of the present disclosure.

FIG. 2 illustrates an example of a wireless communications subsystem that supports techniques for transmitting demodulation reference signals using noncoherent modulation in accordance with various aspects of the present disclosure.

Wireless communications system 200 includes a base station 205 and UE 215, which may be examples of a base station and UE as described with reference to FIG. 1. Base station 205 and UE 215 may communicate with one another within coverage area 210 as described with reference to FIG. 1.

In some examples, base station 205 may transmit downlink data 225 to UE 215 over downlink 230. To support the reception of downlink data 225 at UE 215, base station 205 may also transmit downlink DMRS 220. Additionally, to increase an amount of data that is communicated to UE 215, base station 205 may generate downlink DMRS 220 using data that is scheduled for transmission to UE 215. That is, base station 205 may modulate the data to obtain one or more modulated data symbols and may transmit a signal that includes the modulated data symbols to UE 215. In some examples, base station 205 may modulate the data using a differential modulation technique (e.g., DPSK).

UE 215 may receive downlink DMRS 220 over downlink 230. UE 215 may also demodulate and decode downlink DMRS 220 to extract the data included in downlink DMRS 220 by base station 205. After decoding the data, UE 215 may use the extracted data to descramble downlink DMRS 220. That is, UE 215 may reencode the extracted data and remodulate the extracted data to obtain one or more modulated data symbols. UE 215 may compare the one or more modulated data symbols with received downlink DMRS 220 to perform time domain equalization and channel estimation.

Similarly, UE 215 may transmit uplink data 235 to base station 205 over uplink 245. To support the reception of uplink data 235 at base station 205, UE 215 may also transmit uplink DMRS 240. Additionally, to increase an amount of data that is communicated to base station 205, UE 215 may generate uplink DMRS 240 using data that is scheduled for transmission to base station 205, as similarly described with reference to base station 205 transmitting downlink DMRS 220 to UE 215. Base station 205 may extract the data from uplink DMRS 240 and use the extracted data to descramble uplink DMRS 240, as similarly described with reference to UE 215 receiving downlink DMRS 220 from base station 205.

Figure 3:
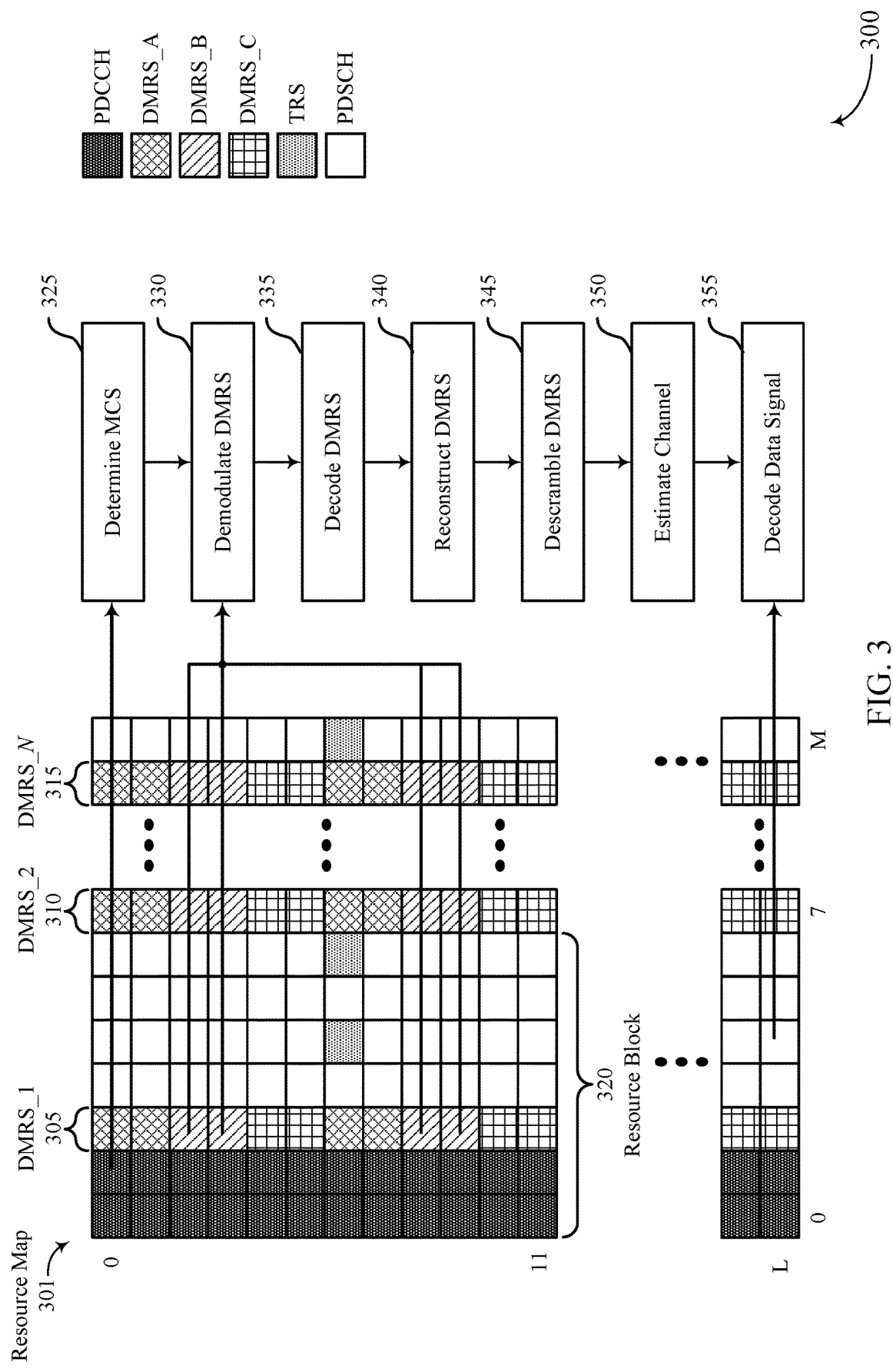
FIG. 3 illustrates an example of an operating diagram that supports techniques for transmitting demodulation reference signals using noncoherent modulation in accordance with various aspects of the present disclosure.

FIG. 3 illustrates an example of an operating diagram that supports techniques for transmitting demodulation reference signals using noncoherent modulation in accordance with various aspects of the present disclosure.

Operating diagram 300 may illustrate aspects of a decoding operation with respect to an exemplary resource allocation illustrated by resource map 301. Resource map 301 may include a grid of time and frequency resources along with an indication of a channel or reference signal for which a time and frequency resource (e.g., a resource element) has been allocated. Resource map 301 may indicate that a first set of resources are allocated to a physical downlink control channel (PDCCH) (e.g., the resources that occur in the first two symbol periods, symbol period_0 and symbol period_1). Resource map 301 may also indicate that a second set of resources are allocated to first DMRS 305 (e.g., the resources that occur in the third symbol period, symbol period_2); a third set of resources are allocated to second DMRS 310 (e.g., the resources that occur in the eight symbol period, symbol period_7); and fourth set of resources are allocated to nth DMRS 315 (e.g., the resources that occur in the (M−1)th symbol period, e.g., symbol period_(M−2)). Additionally, resource map 301 may indicate that a fifth set of resources is allocated to a tracking reference signal (TRS) (e.g., a PTRS) and that the remaining resources are allocated to a PDSCH.

First DMRS 305 may include multiple signal components that are transmitted from different antenna ports using a set of orthogonal codes. In some examples, the resources allocated to first DMRS 305 (which may be referred to as "DMRS_1 resources") are partitioned into CDM groups. In some examples, in resource block 320, the DMRS_1 resources may be partitioned into three CDM groups and each CDM group may include four resource elements. Resource block 320 may include 12 subcarriers and 7 symbol periods. In such cases, the DMRS_1 resources in resource block 320 may support the transmission of six separate signals from six different antenna ports. That is, (1) two signals from two antenna ports may be transmitted over a first CDM group (which may be represented by the resource elements allocated to DMRS_1.A in resource block 320) using a pair of orthogonal codes; (2) another two signals from another two antenna ports may be transmitted over a second CDM group (which may be represented by the resource elements allocated to DMRS_1.B in resource block 320) using the pair of orthogonal codes; and (3) two more signals from two more antenna ports may be transmitted over a third CDM group (which may be represented by the resource elements allocated to DMRS_1.C in resource block 320) using the pair of orthogonal codes. The resources allocated to second DMRS 310 and nth DMRS 315 may similarly support the transmission of multiple signal components from different antenna ports using a set of orthogonal codes.

As described herein, one or more (e.g., all) DMRSs included in resource block 320 may be generated using user data. That is, data scheduled to be transmitted to a receiving device may be encoded (e.g., using a turbo, LDPC, polar, or convolutional code) and modulated using a noncoherent modulation technique (e.g., DPSK or DAPSK) to obtain one or more modulated symbols. The one or more modulated symbols may then be used to generate a signal (e.g., first DMRS 305) that is to be transmitted over designated resources (e.g., the resources allocated to first DMRS 305).

In some examples, a signal including the first modulated symbol of the one or more modulated symbols that corresponds to a first portion of the data is transmitted over the resources allocated to first DMRS 305 within resource block 320. For example, the signal including the first modulated symbol may be transmitted using the resources included in the second CDM group of the resources allocated to first DMRS 305 in resource block 320 (which may be represented by the resources allocated to DMRS_1.B in resource block 320).

In some examples, the first modulated symbol may also be transmitted using the resources included in the first and third CMD groups of the resources allocated to first DMRS 305 in resource block 320. In other examples, different modulated symbols may be transmitted using the resources included in the first and third CDM groups of the resources allocated to first DMRS 305 in resource block 320—e.g., if a MIMO transmission mode is enabled. In some examples, different modulated symbols may be transmitted over the same DMRS resources—e.g., if a MIMO transmission mode is enabled. In some examples, one or more DMRSs included in resource block 320 may be generated using user data and one or more DMRSs included in resource block 320 may be transmitted using a pseudorandom sequence (e.g., nth DMRS 315)—e.g., if a URLLC mode is enabled.

After the transmitting device performs a transmission including reference and data signals in accordance with resource map 301, a receiving device may receive and process the transmission. At block 325, the receiving device may determine a modulation and coding scheme (MCS) used for transmitting the data signals and an MCS used for transmitting the DMRSs that include data (which may be referred to as "data DMRS"). In some examples, the receiving device determines the MCS used for transmitting the data signals by decoding downlink control information (DCI) received in the PDCCH resources. The receiving device may determine the MCS used for transmitting the data DMRS based on a difference between the MCS used for the data signal and an MCS used for data DMRS signals and/or a maximum MCS limit for data DMRS transmissions. In some examples, the difference is signaled in the DCI. In other examples, the difference is signaled in radio resource control (RRC) signaling or is preprogrammed into the receiving device.

At block 330, the receiving device may demodulate a signal component of first DMRS 305 transmitted over the DMRS_1.B resources. Demodulating the signal component of first DMRS 305 may include using an orthogonal code to separate the signal component from another signal component of first DMRS 305 transmitted over the DMRS_1.B resources. Next, the receiving device may demodulate a modulation symbol received over the DMRS_1.B resources using a noncoherent demodulation technique (e.g., DPSK or DAPSK) to obtain a demodulated symbol.

At block 335, the receiving device may decode the demodulated symbol to obtain a data sequence. In some examples, decoding the demodulated symbol further includes removing or reorganizing bits in the data sequence in accordance with an encoding scheme used to encode data scheduled to be transmitted to the receiving device by the transmitting device. The receiving device may similarly decode demodulated symbols in other signal components of first DMRS 305. After decoding the demodulated symbols, the receiving device may obtain the original data sequence transmitted from the transmitting device using first DMRS 305.

At block 340, the receiving device may use the original data sequence to reconstruct the version of first DMRS 305 that was originally transmitted from the transmitting device (which may be referred to as a "reconstructed DMRS"). In some examples, the receiving device reencodes the original data sequence using the coding technique used by the transmitting device and remodulates the encoded data using the noncoherent modulation technique used by the transmitting device.

At block 345, the receiving device may descramble the received version of first DMRS 305 using the reconstructed DMRS. After descrambling the DMRS, the receiving device may isolate the component of the received version of first DMRS 305 that corresponds to the signal transmitted from the antenna port over the DMRS_1.B resources.

At block 350, the receiving device may estimate characteristics of the channel used to transmit first DMRS 305 based on the isolated component of the first DMRS 305. The receiving device may determine characteristics such as delay spread, channel type, Doppler frequency, signal-to-noise ratios (e.g., SNR and/or signal-to-interference-plus-noise ratio (SINR)), and the like. The receiving device may further use these characteristics to perform time domain equalization and channel estimation.

At block 355, the receiving device may decode a data signal received over the resources allocated to the PDSCH based on the time domain equalization and channel estimation determined using first DMRS 305—e.g., because the DMRS use a same precoding as a PDSCH signal and, thus, may be communicated using a same or similar channel. In some examples, the receiving device determines the data signal was transmitted using an antenna port and uses the channel estimate derived for the DMRS transmitted using that antenna port to decode the data signal.

Although discussed in the context of a component of first DMRS 305 that is transmitted over DMRS 1.B resources, the above operations may similarly be performed for the remaining resources in first DMRS 305 and for the resources allocated to the remaining DMRSs. In some examples, the transmitting device transmits the same data from each antenna port over the resources allocated to a DMRS and included in resource block 320. In other examples, the transmitting device transmits different data from each antenna port over the resources allocated to a DMRS and included in resource block 320—e.g., if the transmitting and receiving devices support MIMO communications. In some examples, the transmitting device is a base station and the receiving device is a UE. In other example, the transmitting device is a UE and the receiving device is a base station. In such cases, the resource allocation may be altered relative to the resource allocation illustrated by resource map 301.

Figure 4:
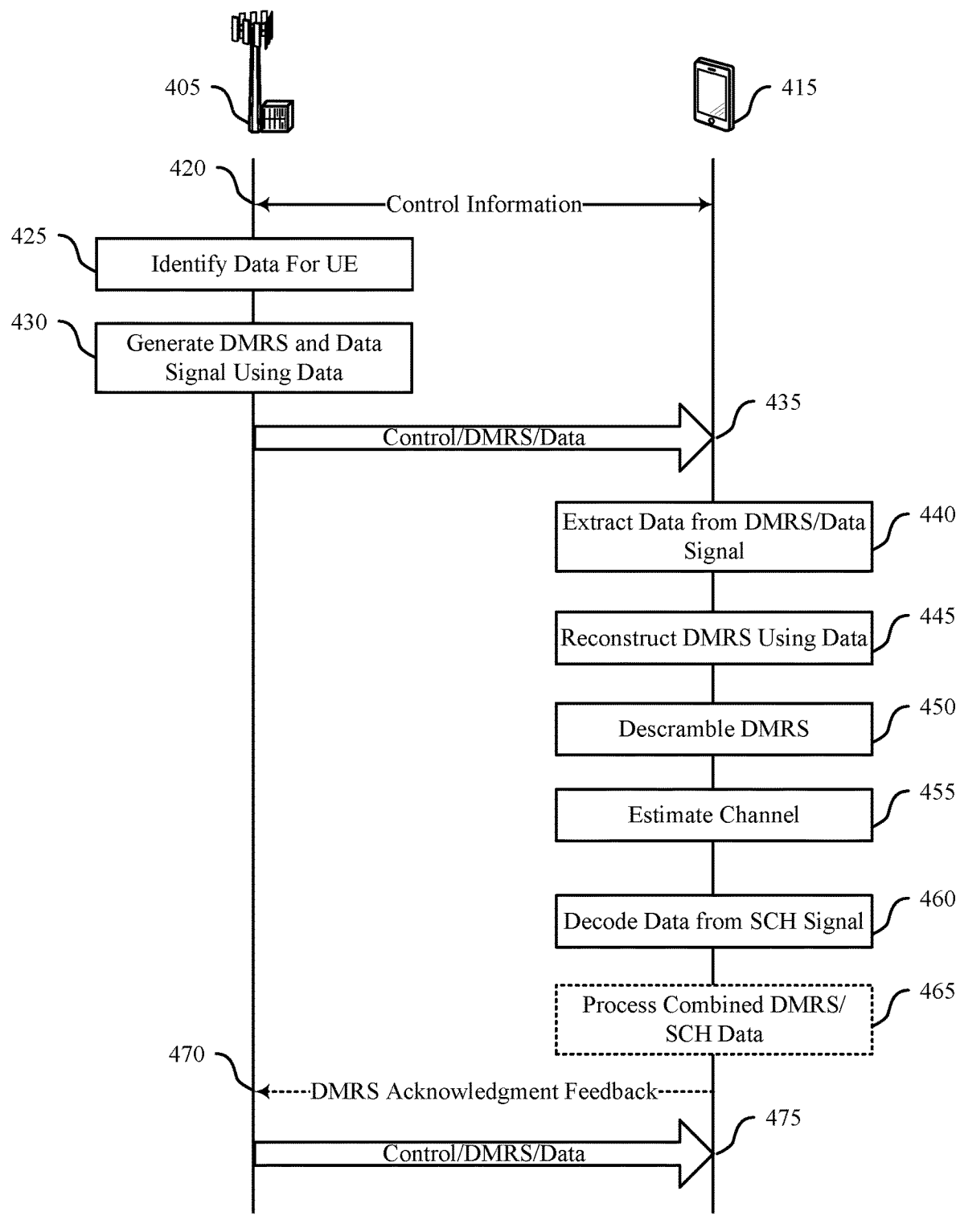
FIG. 4 illustrates an example of a process flow that supports techniques for transmitting demodulation reference signals using noncoherent modulation in accordance with various aspects of the present disclosure.

FIG. 4 illustrates an example of a process flow that supports techniques for transmitting demodulation reference signals using noncoherent modulation in accordance with various aspects of the present disclosure.

Process flow 400 may be performed by base station 405 and UE 415, which may be examples of a base station or UE described above with reference to FIGS. 1 and 2. In some examples, process flow 400 illustrates an exemplary sequence of operations performed to support transmitting demodulation reference signal using noncoherent modulation. For example, process flow 400 depicts operations for transmitting one or more DMRSs that include data and are modulated using differential modulation.

It is understood that one or more of the operations described in process flow 400 may be performed earlier or later in the process, omitted, replaced, supplemented, or performed in combination with another operation. Also, additional operations described herein that are not included in process flow 400 may be included.

At arrow 420, base station 405 and UE 415 may exchange control information (e.g., in RRC signaling). In some examples, base station 405 and UE 415 may indicate to one another a capability to transmit data DMRSs. In some examples, base station 405 may indicate a difference in MCS levels used for data signal transmissions and data DMRS transmissions. Base station 405 may also indicate a maximum MCS level for data DMRS transmissions. In some examples, base station 405 may indicate the difference in MCS levels and/or maximum MCS level for data DMRS after receiving a request from UE 415. In other examples, UE 415 may request a difference between MCS levels and base station 405 may send an acknowledgement to UE 415 indicating whether the requested difference is approved. In some examples, base station 405 may also indicate a modulation technique that is to be used for data DMRS transmission—e.g., a noncoherent modulation technique such as DPSK or DAPSK. Base station 405 may also indicate to UE 415 that a mode that supports data DMRS transmissions is enabled. In some examples, base station 405 may indicate that the data DMRS transmission mode is enabled when a signal-to-noise ratio (SNR) for a channel between base station 405 and UE 415 exceeds a threshold value—e.g., to avoid the effects of squared noise that may occur at lower SNRs.

At block 425, base station 405 may identify data that is scheduled for transmission to UE 415. The data may include control information that is specific to UE 415 or user data for UE 415 such as data for a voice, messaging, or data service. In some examples, base station 405 selects additional data to include in data DMRS transmission if a MIMO transmission mode is enabled relative to if the MIMO transmission mode is not enabled—e.g., because multiple antenna ports may be used to transmit different data streams with minimal interference using the same or adjacent communication resources.

At block 430, base station 405 may generate a data signal and one or more DMRSs for transmission to UE 415—e.g., based on identifying a set of resources allocated to UE 415. If the mode that supports data DMRS transmissions is enabled, base station 405 may identify a first portion of the data that is to be transmitted in a data signal (e.g., over PDSCH resources) and a second portion of the data (which may be referred to as DMRS data) that is to be transmitted in one or more DMRSs transmitted concurrently with the data signal. In some examples, base station 405 enables the data DMRS transmission mode based on determining that one or more scheduled DMRSs will occupy a threshold percentage of the resources available for data transmission (e.g., greater than 15%).

After identifying the first portion and second portions of data, base station 405 may encode the first data using a first encoding technique (e.g., a turbo, LDPC, polar, or convolutional encoding scheme) to obtain first encoded data and may encode the DMRS data using a second encoding technique that is the same or different than the first encoding technique to obtain second encoded data. After encoding the first and second data, base station 405 may modulate the first encoded data using a coherent modulation technique (e.g., PSK or QAM), where the transmitted data DMRS may support the operation of the coherent modulation technique used to transmit the first data to obtain a set of modulated data symbols. Also, base station 405 may modulate the encoded DMRS data using a noncoherent demodulation technique (e.g., DPSK or DAPSK) to obtain a set of modulated data DMRS symbols. In some examples, base station 405 modulates the DMRS data using DPSK to achieve a constant power envelope, enhancing a quality of a channel estimate obtainable from the data DMRS.

In some examples, base station 405 packages the data DMRS information and the data signal information in a single transport block. In such cases, base station 405 may compute a single CRC for the transport block. In other examples, base station 405 packages the data DMRS information and data signal information in separate transport blocks. In such cases, base station 405 may compute a CRC for the data DMRS transport block and another CRC for the data transport block. Base station 405 may include the CRC bits for the data DMRS in the data DMRS.

At arrow 435, base station 405 may transmit control information (e.g., PDCCH signaling), reference signals (e.g., data DMRSs, TRSs, etc.), and data (e.g., PDSCH signaling) to UE 415. In some examples, base station 405 indicates in the control information that the data DMRS mode is activated and that one or more DMRSs in the transmission include data. In some examples, base station 405 activates the data DMRS mode after determining an SNR for the channel exceeds a threshold. Base station 405 may also include an indication of a difference K in an MCS level used for data transmissions and data DMRS transmissions. Base station 405 may transmit one or more data DMRSs using allocated DMRS resources. Transmitting a data DMRS may include transmitting the data DMRS over a set of resources that spans one or two symbol periods, where the DMRS may be transmitted using multiple antenna ports in accordance with a set of configured CDM groups and available orthogonal codes, as similarly described with reference to FIG. 3. In some examples, data DMRS transmissions may employ frequency interleaving.

In some examples, one or more modulated data DMRS symbols may be transmitted in a data DMRS. For example, a first modulated data DMRS symbol may be transmitted using a DMRS resource that spans a symbol period in a first resource block, a second modulated data DMRS symbol may be transmitted using another DMRS resource that spans the symbol period in a second resource block and so on. Additionally, if the DMRS resource spans two symbol periods, an additional modulated data DMRS symbol may be transmitted using the second symbol period in the first resource block, another DMRS symbol may be transmitted using the second symbol period in the second resource block, and so on. In some examples, each antenna port transmits the same data sequence over the DMRS resources included in a resource block. In other examples (e.g., if a MIMO transmission mode is supported), one or more (e.g., all) of the antenna ports may transmit a different data sequence over the DMRS resources using different spatial layers, increasing an amount of data transmitted using a data DMRS. For example, the antenna ports associated with a first CDM group in a resource block may transmit a first data sequence using a first spatial layer, the antenna ports associated with a second CDM group in a resource block may transmit a second data sequence using a second spatial layer, and so on.

In some examples, base station 405 may include multiple data DMRS in a transmission. In some examples, base station 405 may include one or more data DMRS and one or more pilot (non-data) DMRS in a transmission—e.g., to support low latency communications. In such cases, base station 405 may configure one or more DMRSs that occur near an end of the transmission as pilot DMRSs.

Base station 405 may also transmit a data signal (e.g., over PDSCH resources). In some examples, base station 405 uses one or more antenna ports to transmit the data signal. Base station 405 may use multiple antenna ports to transmit the data signal if a transmit diversity mode is enabled or if a MIMO communication mode is enabled.

At block 440, UE 415 may extract data from data DMRSs and data signals received from base station 405—e.g., based on the control information received from base station 405. UE 415 may determine that a data DMRS mode is enabled and that one or more DMRSs in the transmission received from base station 405 are being used to convey data. In some examples, UE 415 may determine that a subset of the DMRS are being used to convey data and another subset of the DMRS are not being used to convey data—e.g., the DMRS located near an end of the transmission interval. After identifying the data DMRS, UE 415 may demodulate the one or more modulated data DMRS symbols included in the data DMRS using a noncoherent demodulation technique based on a determined MCS level. In some examples, UE 415 may determine an MCS level X used for data transmissions and an MCS level Y used for data DMRS transmissions (where Y=X−K). After demodulating the data DMRS, UE 415 may decode the demodulated data DMRS symbols.

Decoding the demodulated data DMRS symbols may include separating data bits from control bits in accordance with a turbo, LDPC, polar, or convolutional coding technique. Accordingly, UE 415 may obtain a data DMRS sequence from the data DMRS. In some examples, UE 415 uses a joint encoding to decode the data DMRS, combining (e.g., averaging) demodulated data DMRS symbols before converting the demodulated data DMRS symbols to data bits. In some examples, UE 415 uses encodes the different components of the data DMRS separately, obtaining multiple data sequences for multiple components—e.g., when the data DMRS is transmitted using a MIMO technique. In some examples, UE 415 may use CRC bits included in the obtained DMRS sequence to confirm that the data DMRS sequence was successfully received.

At block 445, UE 415 may reconstruct the data DMRS transmitted from base station 405 using the data sequence and the MCS determined for the data DMRS. That is, UE 415 may encode the data DMRS and remodulate the encoded data DMRS using the noncoherent modulation technique used at base station 405.

At block 450, UE 415 may use the reconstructed data DMRS to descramble the DMRS. For example, UE 415 may use the reconstructed DMRS to isolate the component of the DMRS associated with the antenna port(s) used to transmit the data signal.

At block 455, UE 415 may determine time and frequency characteristics of the channel between base station 405 and UE 415 using the descrambled DMRS. For example, UE 415 may determine a channel estimate for each antenna port used to transmit a data DMRS to UE 415. In some examples, UE 415 may determine a delay spread, channel type, Doppler frequency, and/or SNR for the channel based on the descrambled data DMRS.

At block 460, UE 415 may decode the data signal received from base station 405 using a coherent modulation technique (e.g., PSK or QAM) based on the determined channel estimate. Accordingly, UE 415 may obtain a data sequence from the data signal. In some examples, UE 415 may use CRC bits included in the obtained data sequence to confirm that the data sequence was successfully received.

At block 465, UE 415 may process a combination of the data extracted from the data DMRS and data signal—e.g., if a single transport block includes the data DMRS information and data signal information. In such cases, UE 415 may use CRC bits included in the transport block to confirm whether the information received in the data DMRS and data signal was successfully received.

At arrow 470, UE 415 may transmit acknowledgement feedback to base station 405 (e.g., in scheduled physical uplink control channel (PUCCH) resources). In some examples, UE 415 transmits acknowledgment feedback (e.g., an acknowledgment (ACK) or negative acknowledgment (NACK) indicator) for the data DMRS—e.g., based on the CRC bits included in the data DMRS. In some examples, UE 415 transmits acknowledgment feedback for the data signal. In some examples, acknowledgment feedback for the data DMRS is transmitted with HARQ feedback for the data signal. In some examples, acknowledgment feedback for the data DMRS is transmitted in a data DMRS transmitted over the reverse link (e.g., in uplink data DMRS) In some examples, UE 415 transmits acknowledgment feedback for both the data DMRS and data signal—e.g., when a single transport block includes the data DMRS and data information.

At arrow 475, base station 405 may perform another transmission to UE 415. In some examples, base station 405 may retransmit the information included in the previously received data DMRS in a data DMRS included in the current transmission—e.g., based on receiving a NACK indicator from UE 415 for the previous data DMRS and/or data signal.

Although described in the context of downlink DMRS transmissions from base station 405 to UE 415, the concepts described in FIG. 4, and otherwise herein, may be similarly used by UE 415 to transmit uplink DMRS transmissions to base station 405. In such examples, base station 405 may similarly decode uplink DMRS and data signals and provide acknowledgement feedback accordingly.

Figure 5:
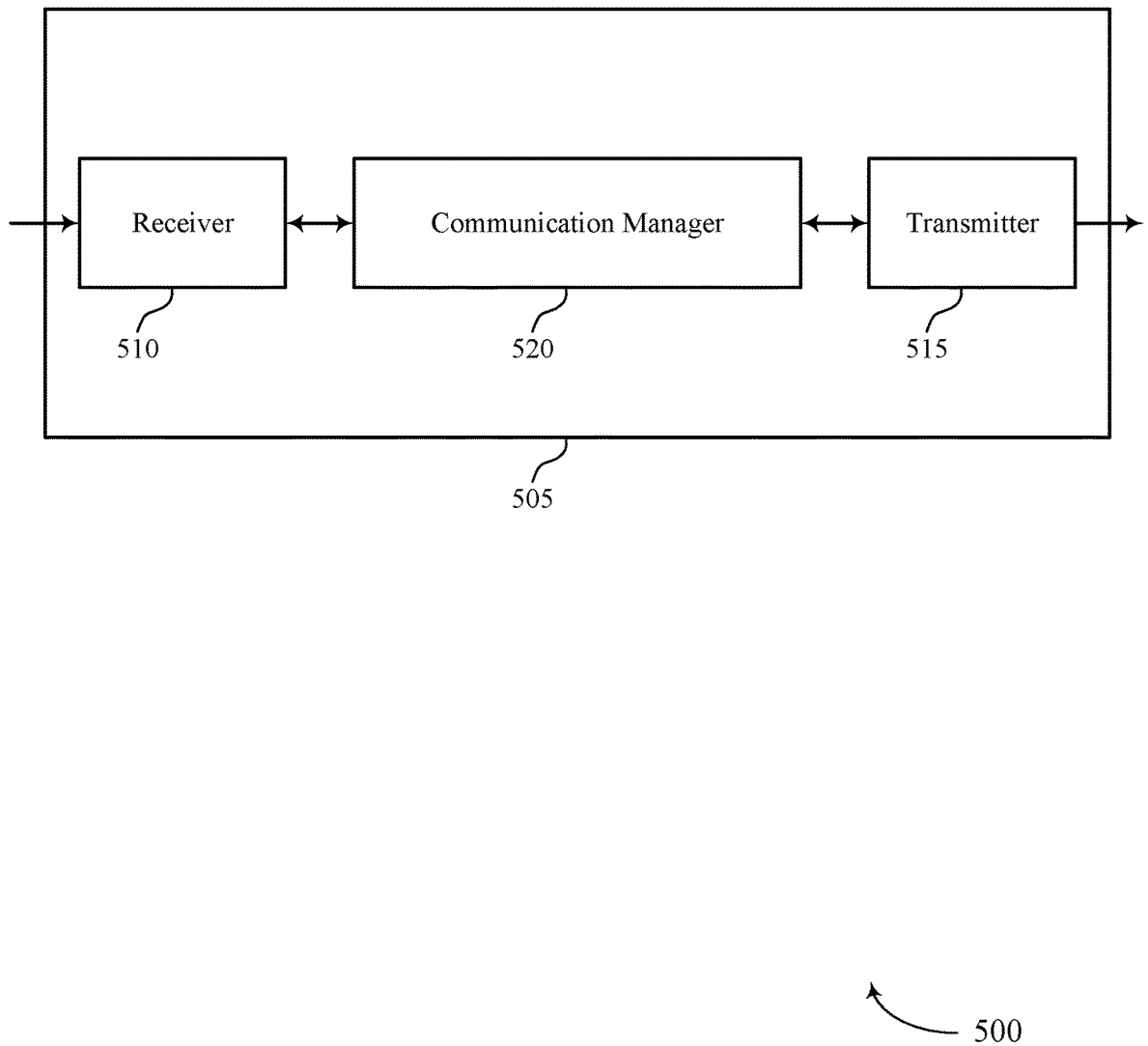
FIGS. 5 and 6 show block diagrams of devices that support techniques for transmitting demodulation reference signals using noncoherent modulation in accordance with various aspects of the present disclosure.

FIG. 5 shows a block diagram of a device that supports techniques for transmitting demodulation reference signals using noncoherent modulation in accordance with various aspects of the present disclosure. Block diagram 500 may depict aspects of device 505. The device 505 may be an example of aspects of a UE 115 or a base station 105 as described herein. The device 505 may include a receiver 510, a transmitter 515, and a communication manager 520. The device 505 may also include a processor. Each of these components may be in communication with one another (e.g., via one or more buses).

The receiver 510 may provide a means for receiving information such as packets, user data, or control information associated with various information channels (e.g., control channels, data channels, information related to techniques for transmitting demodulation reference signals using noncoherent modulation). Information may be passed on to other components of the device 505. The receiver 510 may utilize a single antenna or a plurality of antennas.

The transmitter 515 may provide a means for transmitting signals generated by other components of the device 505. In some examples, the transmitter 515 may be co-located with a receiver 510 in a transceiver component. The transmitter 515 may utilize a single antenna or a plurality of antennas.

The communication manager 520, the receiver 510, the transmitter 515, or various combinations thereof or various components thereof, may be an example of a means for performing various aspects of techniques for transmitting demodulation reference signals using noncoherent modulation as described herein.

In some examples, the communication manager 520, the receiver 510, the transmitter 515, or various combinations thereof or components thereof, may be implemented in hardware (e.g., in communication management circuitry). The circuitry may include a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described in the present disclosure.

Additionally, or alternatively, in some examples, the communication manager 520, the receiver 510, the transmitter 515, or various combinations thereof or components thereof, may be implemented in code (e.g., as communication management software or firmware) executed by a processor. If implemented in code executed by a processor, the functions of the communication manager 520, the receiver 510, the transmitter 515, or various combinations thereof or components thereof, may be executed by a general-purpose processor, a DSP, a central processing unit (CPU), an ASIC, an FPGA, or some other programmable logic device.

In some examples, the communication manager 520 may be configured to perform various operations (e.g., receiving, monitoring, transmitting) using or otherwise in cooperation with the receiver 510, the transmitter 515, or both.

The communication manager 520 may support wireless communication at a receiving device in accordance with examples as disclosed herein. For example, the communication manager 520 may be configured to provide or support a means for receiving a demodulation reference signal comprising a set of modulated symbols, the demodulation reference signal configured to convey user data. The communication manager 520 may be configured to provide or support a means for demodulating, using differential demodulation, the set of modulated symbols to obtain a set of demodulated symbols. The communication manager 520 may be configured to provide or support a means for generating a data sequence based at least in part on the set of demodulated symbols, the data sequence comprising user data for the receiving device. The communication manager 520 may be configured to provide or support a means for descrambling the demodulation reference signal based at least in part on the generated data sequence. The communication manager 520 may be configured to provide or support a means for estimating a physical shared channel based at least in part on the descrambled demodulation reference signal.

The communication manager 520 may support wireless communication at a transmitting device in accordance with examples as disclosed herein. For example, the communication manager 520 may be configured to provide or support a means for identifying a data sequence for transmission to a receiving device. The communication manager 520 may be configured to provide or support a means for generating, using differential modulation, a first set of modulated symbols based at least in part on the data sequence. The communication manager 520 may be configured to provide or support a means for transmitting a demodulation reference signal comprising the first set of modulated symbols.

Figure 6:
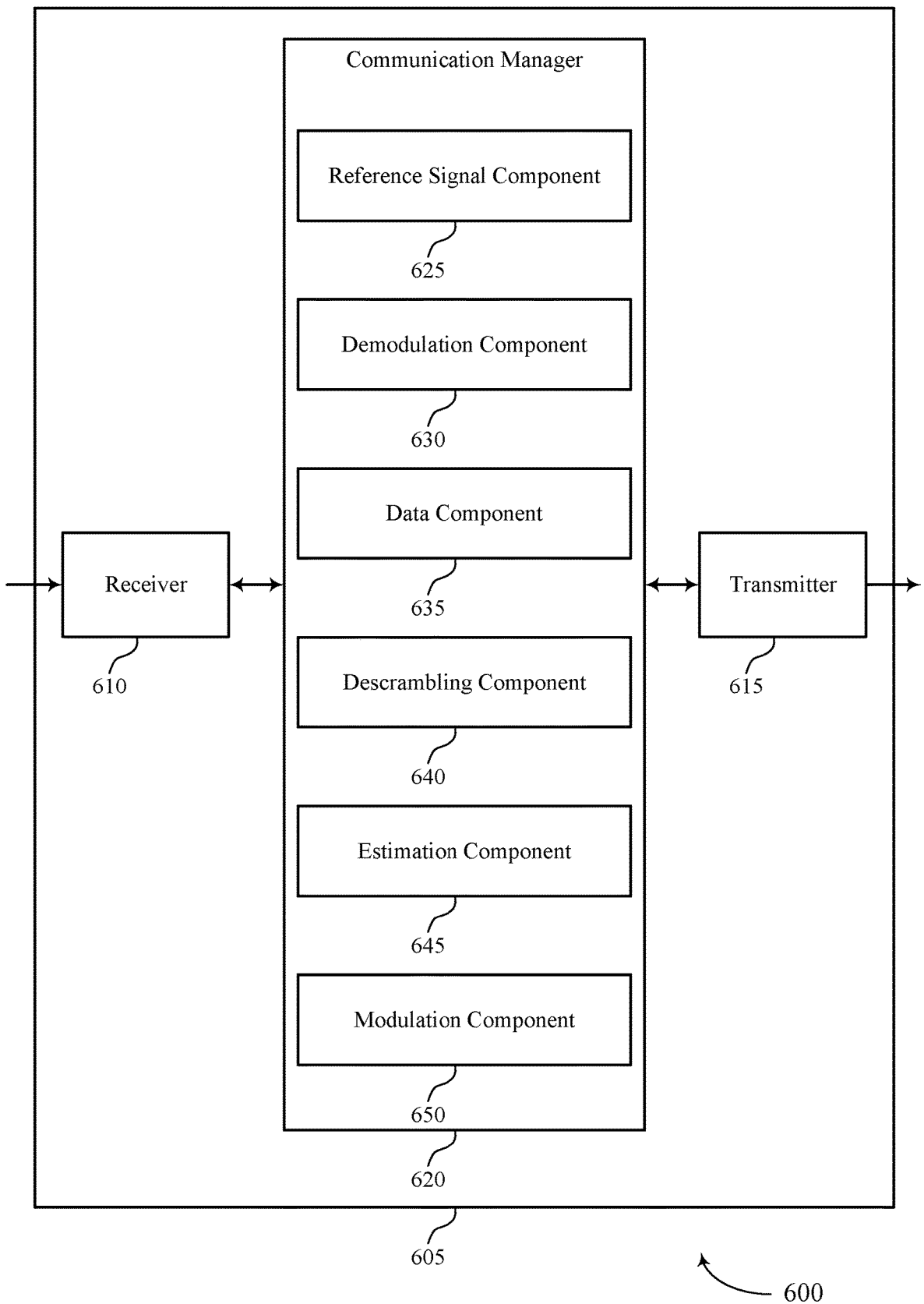

FIG. 6 shows a block diagram of a device that supports techniques for transmitting demodulation reference signals using noncoherent modulation in accordance with various aspects of the present disclosure. Block diagram 600 may depict aspects of device 605. The device 605 may be an example of aspects of a device 505, a UE 115, or a base station 105 as described herein. The device 605 may include a receiver 610, a transmitter 615, and a communication manager 620. The device 605 may also include a processor. Each of these components may be in communication with one another (e.g., via one or more buses).

The receiver 610 may provide a means for receiving information such as packets, user data, or control information associated with various information channels (e.g., control channels, data channels, information related to techniques for transmitting demodulation reference signals using noncoherent modulation). Information may be passed on to other components of the device 605. The receiver 610 may utilize a single antenna or a plurality of antennas.

The transmitter 615 may provide a means for transmitting signals generated by other components of the device 605. In some examples, the transmitter 615 may be co-located with a receiver 610 in a transceiver component. The transmitter 615 may utilize a single antenna or a plurality of antennas.

The device 605, or various components thereof, may be an example of means for performing various aspects of techniques for transmitting demodulation reference signals using noncoherent modulation as described herein. For example, the communication manager 620 may include a reference signal component 625, a demodulation component 630, a data component 635, a descrambling component 640, an estimation component 645, a modulation component 650, or any combination thereof. The communication manager 620 may be an example of aspects of a communication manager 520 as described herein. In some examples, the communication manager 620, or various components thereof, may be configured to perform various operations (e.g., receiving, monitoring, transmitting) using or otherwise in cooperation with the receiver 610, the transmitter 615, or both.

The communication manager 620 may support wireless communication at a receiving device in accordance with examples as disclosed herein. The reference signal component 625 may be configured to provide or support a means for receiving a demodulation reference signal including a set of modulated symbols, the demodulation reference signal configured to convey user data. The demodulation component 630 may be configured to provide or support a means for demodulating, using differential demodulation, the set of modulated symbols to obtain a set of demodulated symbols. The data component 635 may be configured to provide or support a means for generating a data sequence based on the set of demodulated symbols, the data sequence including user data for the receiving device. The descrambling component 640 may be configured to provide or support a means for descrambling the demodulation reference signal based on the generated data sequence. The estimation component 645 may be configured to provide or support a means for estimating a physical shared channel based on the descrambled demodulation reference signal.

The communication manager 620 may support wireless communication at a transmitting device in accordance with examples as disclosed herein. Additionally, or alternatively, the data component 635 may be configured to provide or support a means for identifying a data sequence for transmission to a receiving device. The modulation component 650 may be configured to provide or support a means for generating, using differential modulation, a first set of modulated symbols based on the data sequence. The reference signal component 625 may be configured to provide or support a means for transmitting a demodulation reference signal including the first set of modulated symbols.

Figure 7:
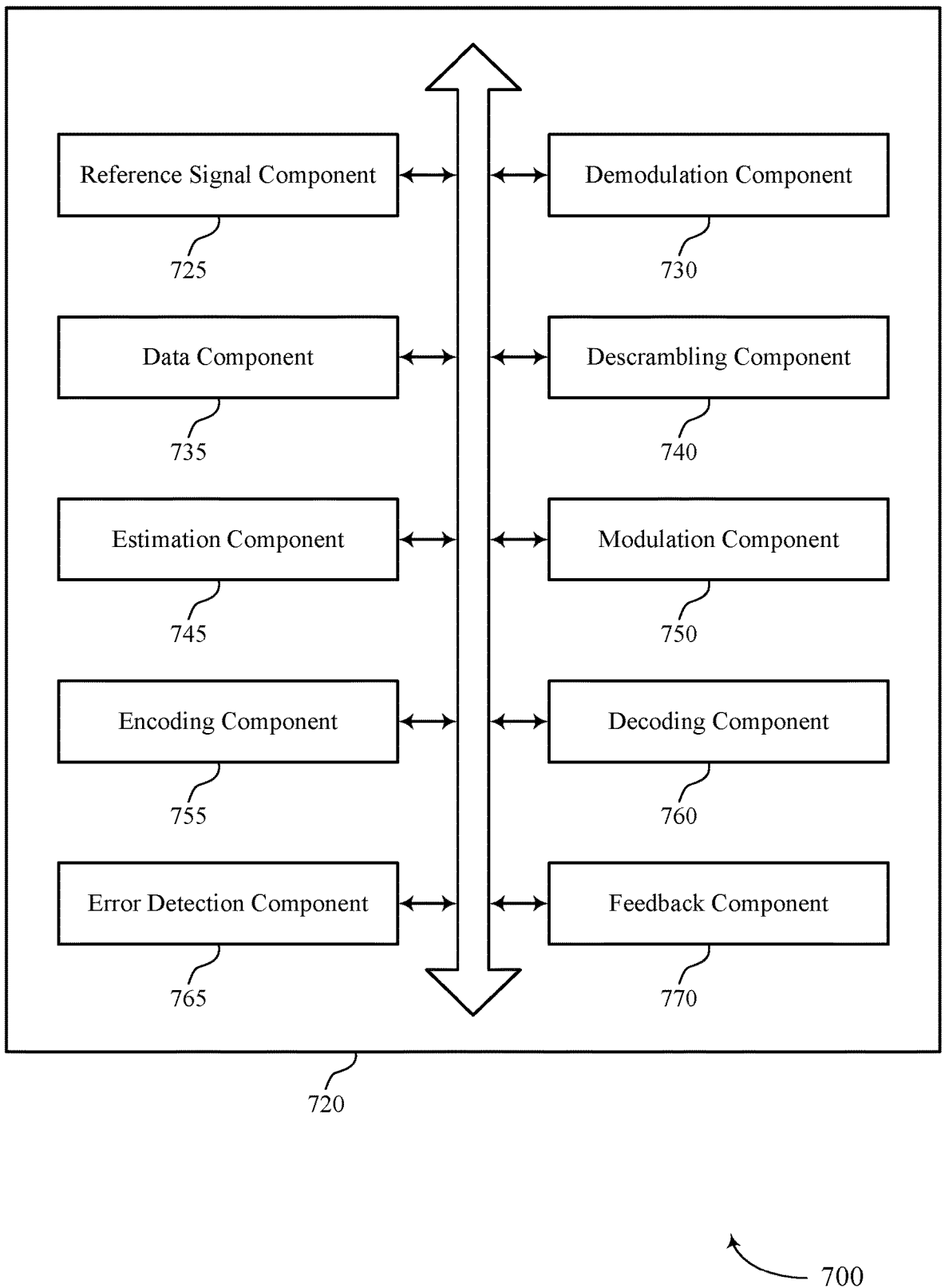
FIG. 7 shows a block diagram of a communication manager that supports techniques for transmitting demodulation reference signals using noncoherent modulation in accordance with various aspects of the present disclosure.

FIG. 7 shows a block diagram of a communication manager that supports techniques for transmitting demodulation reference signals using noncoherent modulation in accordance with various aspects of the present disclosure.

Block diagram 700 may depict aspects of a communication manager 720. The communication manager 720 may be an example of aspects of a communication manager 520, a communication manager 620, or both, as described herein. The communication manager 720, or various components thereof, may be an example of means for performing various aspects of techniques for transmitting demodulation reference signals using noncoherent modulation as described herein. For example, the communication manager 720 may include a reference signal component 725, a demodulation component 730, a data component 735, a descrambling component 740, an estimation component 745, a modulation component 750, an encoding component 755, a decoding component 760, an error detection component 765, a feedback component 770, or any combination thereof. Each of these components may communicate, directly or indirectly, with one another (e.g., via one or more buses).

The communication manager 720 may support wireless communication at a receiving device in accordance with examples as disclosed herein. The reference signal component 725 may be configured to provide or support a means for receiving a demodulation reference signal including a set of modulated symbols, the demodulation reference signal configured to convey user data. The demodulation component 730 may be configured to provide or support a means for demodulating, using differential demodulation, the set of modulated symbols to obtain a set of demodulated symbols. The data component 735 may be configured to provide or support a means for generating a data sequence based on the set of demodulated symbols, the data sequence including user data for the receiving device. The descrambling component 740 may be configured to provide or support a means for descrambling the demodulation reference signal based on the generated data sequence. The estimation component 745 may be configured to provide or support a means for estimating a physical shared channel based on the descrambled demodulation reference signal.

In some examples, to descramble the demodulation reference signal based on the generated data sequence, the encoding component 755 may be configured to provide or support a means for encoding the generated data sequence to obtain a second data sequence. In some examples, to descramble the demodulation reference signal based on the generated data sequence, the modulation component 750 may be configured to provide or support a means for modulating the second data sequence using differential modulation to obtain a second set of modulated symbols, where the demodulation reference signal is descrambled using the second set of modulated symbols.

In some examples, to generate the data sequence, the decoding component 760 may be configured to provide or support a means for decoding the set of demodulated symbols to obtain the data sequence. In some examples, to generate the data sequence, the error detection component 765 may be configured to provide or support a means for checking the data sequence for errors based on a set of cyclic redundancy check bits included in the data sequence.

In some examples, the set of demodulated symbols is decoded in accordance with a low density parity check code, a turbo code, a polar code, or a convolutional code.

In some examples, the feedback component 770 may be configured to provide or support a means for transmitting acknowledgment feedback for the data sequence indicating whether errors were detected in the data sequence based on the set of cyclic redundancy check bits.

In some examples, the demodulation component 730 may be configured to provide or support a means for demodulating a second demodulation reference signal including a second set of demodulated symbols that is a repetition of the set of demodulated symbols based on transmitting acknowledgment feedback indicating that an error was detected in the data sequence.

In some examples, the reference signal component 725 may be configured to provide or support a means for receiving a first component of the demodulation reference signal transmitted from a first antenna port using communication resources and a second component of the demodulation reference signal transmitted from a second antenna port using the same communication resources.

In some examples, the data component 735 may be configured to provide or support a means for extracting the first data from the first component of the demodulation reference signal and the second data from the second component of the demodulation reference signal, where the data sequence includes the first data and the second data.

In some examples, the data component 735 may be configured to provide or support a means for extracting the first data from the first component of the demodulation reference signal and the second component of the demodulation reference signal, where the data sequence includes the first data.

In some examples, the reference signal component 725 may be configured to provide or support a means for separating the first component of the demodulation reference signal from the second component of the demodulation reference signal based on a plurality of orthogonal cover codes.

In some examples, the data component 735 may be configured to provide or support a means for receiving, using a second set of communication resources, a data signal including a second set of modulated symbols.

In some examples, the first set of modulated symbols of the demodulation reference signal are demodulated using differential phase shift keying and the second set of modulated symbols of the data signal are demodulated using coherent demodulation.

In some examples, the demodulation component 730 may be configured to provide or support a means for demodulating, using coherent modulation, the second set of modulated symbols received in the data signal to obtain a second set of demodulated symbols based on the estimated physical shared channel. In some examples, the data component 735 may be configured to provide or support a means for generating a second data sequence based on the second set of demodulated symbols. In some examples, the data component 735 may be configured to provide or support a means for combining the data sequence and the second data sequence to obtain a combined data sequence.

In some examples, the error detection component 765 may be configured to provide or support a means for checking the combined data sequence for errors based on a set of cyclic redundancy check bits included in the combined data sequence.

In some examples, the data component 735 may be configured to provide or support a means for receiving a first indication of a difference between a first modulation and coding scheme level used for the demodulation reference signal and a second modulation and coding scheme level used for the data signal, a second indication of a maximum modulation and coding scheme level for the demodulation reference signal, a third indication that a communication mode that supports demodulation reference signals carrying data is enabled, or any combination thereof.

In some examples, the first indication, the second indication, the third indication, or any combination thereof is received in downlink control information, radio resource control information, or any combination thereof.

In some examples, the data component 735 may be configured to provide or support a means for transmitting a first indication of a difference between a first modulation and coding scheme level used for the demodulation reference signal and a second modulation and coding scheme level used for the data signal, a second indication of a maximum modulation and coding scheme level for the demodulation reference signal, a third indication that a communication mode that supports demodulation reference signals carrying data is enabled, or any combination thereof.

In some examples, the reference signal component 725 may be configured to provide or support a means for receiving, after the demodulation reference signal, a second demodulation reference signal in the time interval, the second demodulation reference signal including a pseudo-random sequence.

In some examples, the reference signal component 725 may be configured to provide or support a means for determining that the demodulation reference signal carries data based on one or more channel characteristics exceeding a threshold.

The communication manager 720 may support wireless communication at a transmitting device in accordance with examples as disclosed herein. In some examples, the data component 735 may be configured to provide or support a means for identifying a data sequence for transmission to a receiving device. The modulation component 750 may be configured to provide or support a means for generating, using differential modulation, a first set of modulated symbols based on the data sequence. In some examples, the reference signal component 725 may be configured to provide or support a means for transmitting a demodulation reference signal including the first set of modulated symbols.

In some examples, the encoding component 755 may be configured to provide or support a means for encoding a portion of the data sequence in accordance with a low density parity check code, a turbo code, a polar code, or a convolutional code, where the first set of modulated symbols are obtained based on the encoded portion of the data sequence.

In some examples, the error detection component 765 may be configured to provide or support a means for generating a set of cyclic redundancy check bits based on a portion of the data sequence used to generate the first set of modulated symbols, where the first set of modulated symbols includes the portion of the data sequence and the set of cyclic redundancy check bits.

In some examples, the feedback component 770 may be configured to provide or support a means for receiving acknowledgment feedback indicating that an error was detected in a second data sequence conveyed by the demodulation reference signal based on the set of cyclic redundancy check bits. In some examples, the reference signal component 725 may be configured to provide or support a means for transmitting a second demodulation reference signal including a second set of modulated symbols including the portion of the data sequence and the set of cyclic redundancy check bits.

In some examples, to transmit the demodulation reference signal, the reference signal component 725 may be configured to provide or support a means for transmitting, using a first antenna port, a first component of the demodulation reference signal over communication resources in accordance with a first orthogonal cover code of a plurality of orthogonal cover codes. In some examples, to transmit the demodulation reference signal, the reference signal component 725 may be configured to provide or support a means for transmitting, using a second antenna port, a second component of the demodulation reference signal over the same communication resources in accordance with a second orthogonal cover code of the plurality of orthogonal cover codes.

In some examples, to transmit the demodulation reference signal, the reference signal component 725 may be configured to provide or support a means for transmitting the first component of the demodulation reference signal over a first spatial layer, the first component of the demodulation reference signal including a first portion of the data sequence. In some examples, to transmit the demodulation reference signal, the reference signal component 725 may be configured to provide or support a means for transmitting the second component of the demodulation reference signal over a second spatial layer, the second component of the demodulation reference signal including a second portion of the data sequence.

In some examples, the modulation component 750 may be configured to provide or support a means for generating, using coherent modulation, a second set of modulated symbols based on the data sequence. In some examples, the data component 735 may be configured to provide or support a means for transmitting, concurrently with the demodulation reference signal, a data signal including the second set of modulated symbols, where the demodulation reference signal is transmitted in accordance with a first modulation and coding scheme level and the data signal is transmitted in accordance with a second modulation and coding scheme level.

Figure 8:
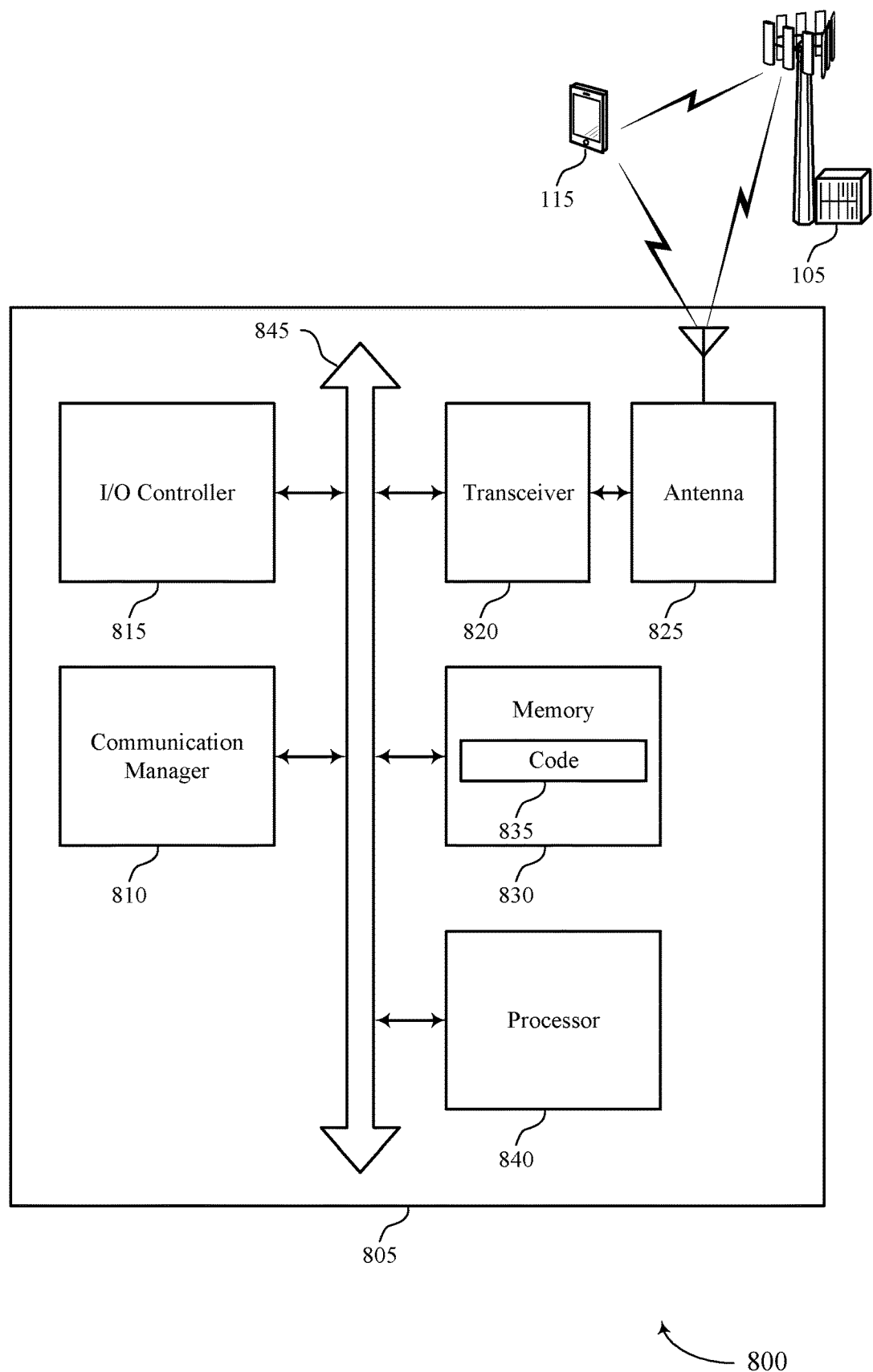
FIGS. 8 and 9 shows a diagram of a system including a device that supports techniques for transmitting demodulation reference signals using noncoherent modulation in accordance with various aspects of the present disclosure.

FIG. 8 shows a diagram of a system including a device that supports techniques for transmitting demodulation reference signals using noncoherent modulation in accordance with various aspects of the present disclosure. System 800 may include a device 805. The device 805 may be an example of or include the components of device, device 605, or a UE 115 as described herein. The device 805 may communicate wirelessly with one or more base stations 105, UEs 115, or any combination thereof. The device 805 may include components for bi-directional voice and data communications including components for transmitting and receiving communications, including a communication manager 810, a I/O controller 815, a transceiver 820, an antenna 825, a memory 830, a code 835, and a processor 840. These components may be in electronic communication or otherwise coupled (e.g., operatively, communicatively, functionally, electronically, electrically) via one or more buses (e.g., bus 845).

The I/O controller 815 may manage input and output signals for device 805. The I/O controller 815 may also manage peripherals not integrated into device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with device 805 via the I/O controller 815 or via hardware components controlled by the I/O controller 815.

In some cases, the antenna 825 may include a single antenna. In other examples, the antenna 825 may include more than one antenna, which may be capable of concurrently transmitting or receiving multiple wireless transmissions. The transceiver 820 may communicate bi-directionally, via the antenna 825, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antenna 825 for transmission, and to demodulate packets received from the antenna 825. The transceiver 820, or the transceiver 820 and antenna 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store code 835 that is computer-readable, computer-executable, and includes instructions that, when executed by the processor 840, cause the device 805 to perform various functions described herein. The code 835 may be stored in a non-transitory computer-readable medium such as system memory or other type of memory. In some cases, the code 835 may not be directly executable by the processor 840 but may cause a computer (e.g., when compiled and executed) to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for transmitting demodulation reference signals using noncoherent modulation).

The communication manager 810 may support wireless communication at a receiving device in accordance with examples as disclosed herein. For example, the communication manager 810 may be configured to provide or support a means for receiving a demodulation reference signal including a set of modulated symbols, the demodulation reference signal configured to convey user data. The communication manager 810 may be configured to provide or support a means for demodulating, using differential demodulation, the set of modulated symbols to obtain a set of demodulated symbols. The communication manager 810 may be configured to provide or support a means for generating a data sequence based on the set of demodulated symbols, the data sequence including user data for the receiving device. The communication manager 810 may be configured to provide or support a means for descrambling the demodulation reference signal based on the generated data sequence. The communication manager 810 may be configured to provide or support a means for estimating a physical shared channel based on the descrambled demodulation reference signal.

The communication manager 810 may support wireless communication at a transmitting device in accordance with examples as disclosed herein. For example, the communication manager 810 may be configured to provide or support a means for identifying a data sequence for transmission to a receiving device. The communication manager 810 may be configured to provide or support a means for generating, using differential modulation, a first set of modulated symbols based on the data sequence. The communication manager 810 may be configured to provide or support a means for transmitting a demodulation reference signal including the first set of modulated symbols.

By including or configuring the communication manager 810 in accordance with examples as described herein, the device 805 may support improved techniques for reducing an amount of signaling overhead created by DMRS transmissions, increasing an amount of data that can be exchanged in a wireless communication.

In some examples, the communication manager 810 may be configured to perform various operations (e.g., receiving, monitoring, transmitting) using or otherwise in cooperation with the transceiver 820, the antenna 825, or any combination thereof. Although the communication manager 810 is illustrated as a separate component, in some examples, one or more functions described with reference to the communication manager 810 may be supported by or performed by the processor 840, the memory 830, the code 835, or any combination thereof. For example, the code 835 may include instructions executable by the processor 840 to cause the device 805 to perform various aspects of techniques for transmitting demodulation reference signals using noncoherent modulation as described herein, or the processor 840 and the memory 830 may be otherwise configured to perform or support such operations.

Figure 9:
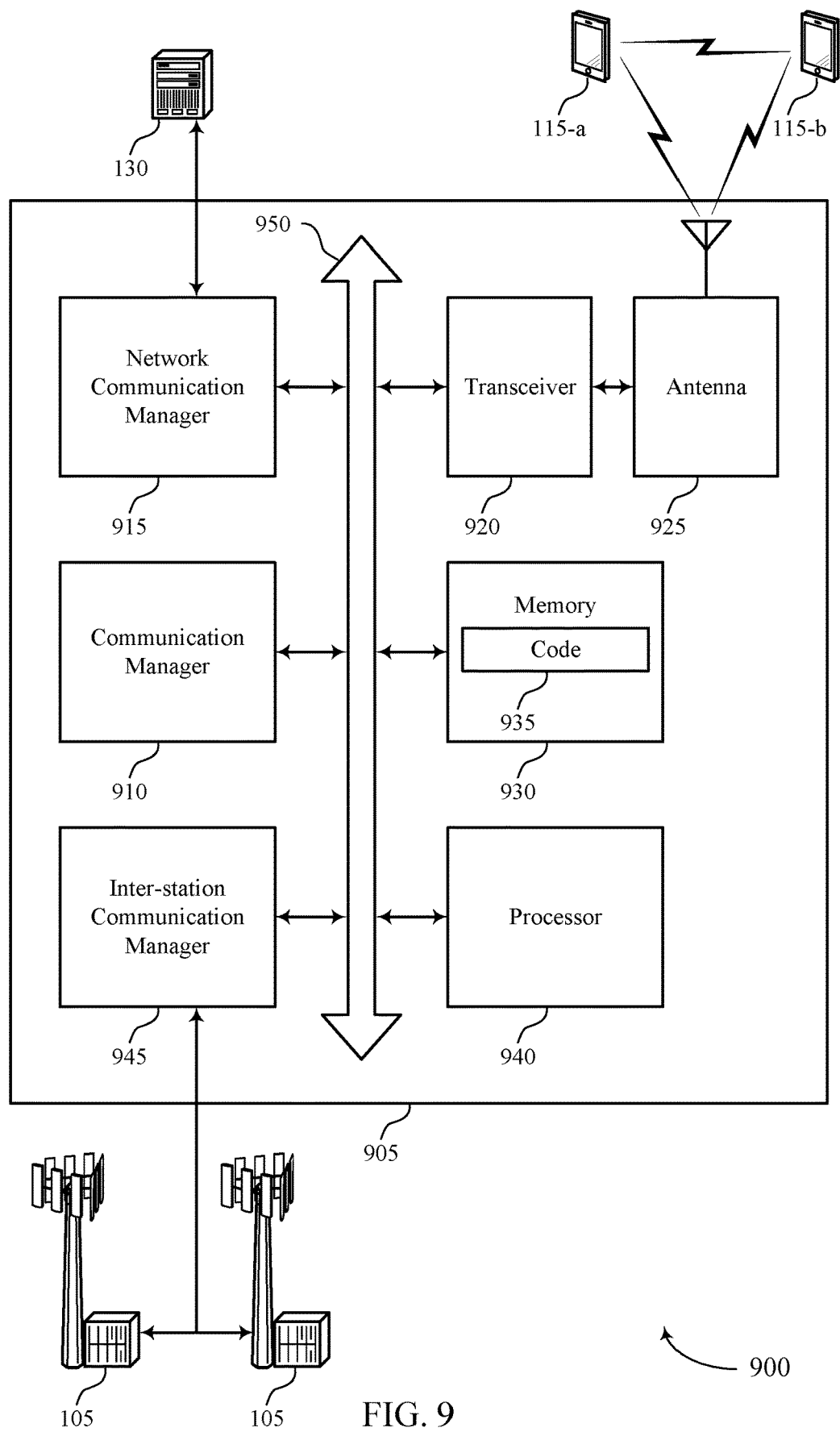

FIG. 9 shows a diagram of a system including a device that supports techniques for transmitting demodulation reference signals using noncoherent modulation in accordance with various aspects of the present disclosure. System 900 may include a device 905. The device 905 may be an example of or include the components of device 605, or a base station 105 as described herein. The device 905 may communicate wirelessly with one or more base stations 105, UEs 115, or any combination thereof. The device 905 may include components for bi-directional voice and data communications including components for transmitting and receiving communications, including a communication manager 910, a network communication manager 915, a transceiver 920, an antenna 925, a memory 930, a code 935, a processor 940, and an inter-station communication manager 945. These components may be in electronic communication or otherwise coupled (e.g., operatively, communicatively, functionally, electronically, electrically) via one or more buses (e.g., bus 950).

The network communication manager 915 may manage communications with the core network (e.g., via one or more wired backhaul links). For example, the network communication manager 915 may manage the transfer of data communications for client devices, such as one or more UEs 115.

In some cases, antenna 925 may include a single antenna 925. In other cases, antenna 925 may include more than one antenna, which may be capable of concurrently transmitting or receiving multiple wireless transmissions. The transceiver 920 may communicate bi-directionally, via the antenna 925, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antenna 925 for transmission, and to demodulate packets received from the antenna 925. The transceiver 920, or the transceiver 920 and antenna 925, may be an example of a transmitter 515, a transmitter 615, a receiver 510, a receiver 610, or any combination thereof or component thereof, as described herein.

The memory 930 may include RAM and read-only memory ROM. The memory 930 may store code 935 that is computer-readable and computer-executable and that includes instructions that, when executed by the processor 940, cause the device 905 to perform various functions described herein. The code 935 may be stored in a non-transitory computer-readable medium such as system memory or other type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for transmitting demodulation reference signals using noncoherent modulation).

The inter-station communication manager 945 may manage communications with other base station 105, and may include a controller or scheduler for controlling communications with UEs 115 in cooperation with other base stations 105. For example, the inter-station communication manager 945 may coordinate scheduling for transmissions to UEs 115 for various interference mitigation techniques such as beamforming or joint transmission. In some examples, the inter-station communication manager 945 may provide an X2 interface within an LTE/LTE-A wireless communication network technology to provide communication between base stations 105.

The communication manager 910 may support wireless communication at a receiving device in accordance with examples as disclosed herein. For example, the communication manager 910 may be configured to provide or support a means for receiving a demodulation reference signal including a set of modulated symbols, the demodulation reference signal configured to convey user data. The communication manager 910 may be configured to provide or support a means for demodulating, using differential demodulation, the set of modulated symbols to obtain a set of demodulated symbols. The communication manager 910 may be configured to provide or support a means for generating a data sequence based on the set of demodulated symbols, the data sequence including user data for the receiving device. The communication manager 910 may be configured to provide or support a means for descrambling the demodulation reference signal based on the generated data sequence. The communication manager 910 may be configured to provide or support a means for estimating a physical shared channel based on the descrambled demodulation reference signal.

The communication manager 910 may support wireless communication at a transmitting device in accordance with examples as disclosed herein. For example, the communication manager 910 may be configured to provide or support a means for identifying a data sequence for transmission to a receiving device. The communication manager 910 may be configured to provide or support a means for generating, using differential modulation, a first set of modulated symbols based on the data sequence. The communication manager 910 may be configured to provide or support a means for transmitting a demodulation reference signal including the first set of modulated symbols.

By including or configuring the communication manager 910 in accordance with examples as described herein, the device 905 may support improved techniques for reducing an amount of signaling overhead created by DMRS transmissions, increasing an amount of data that can be exchanged in a wireless communication.

In some examples, the communication manager 910 may be configured to perform various operations (e.g., receiving, monitoring, transmitting) using or otherwise in cooperation with the transceiver 920, the antenna 925, or any combination thereof. Although the communication manager 910 is illustrated as a separate component, in some examples, one or more functions described with reference to the communication manager 910 may be supported by or performed by the processor 940, the memory 930, the code 935, or any combination thereof. For example, the code 935 may include instructions executable by the processor 940 to cause the device 905 to perform various aspects of techniques for transmitting demodulation reference signals using noncoherent modulation as described herein, or the processor 940 and the memory 930 may be otherwise configured to perform or support such operations.

Figure 10:
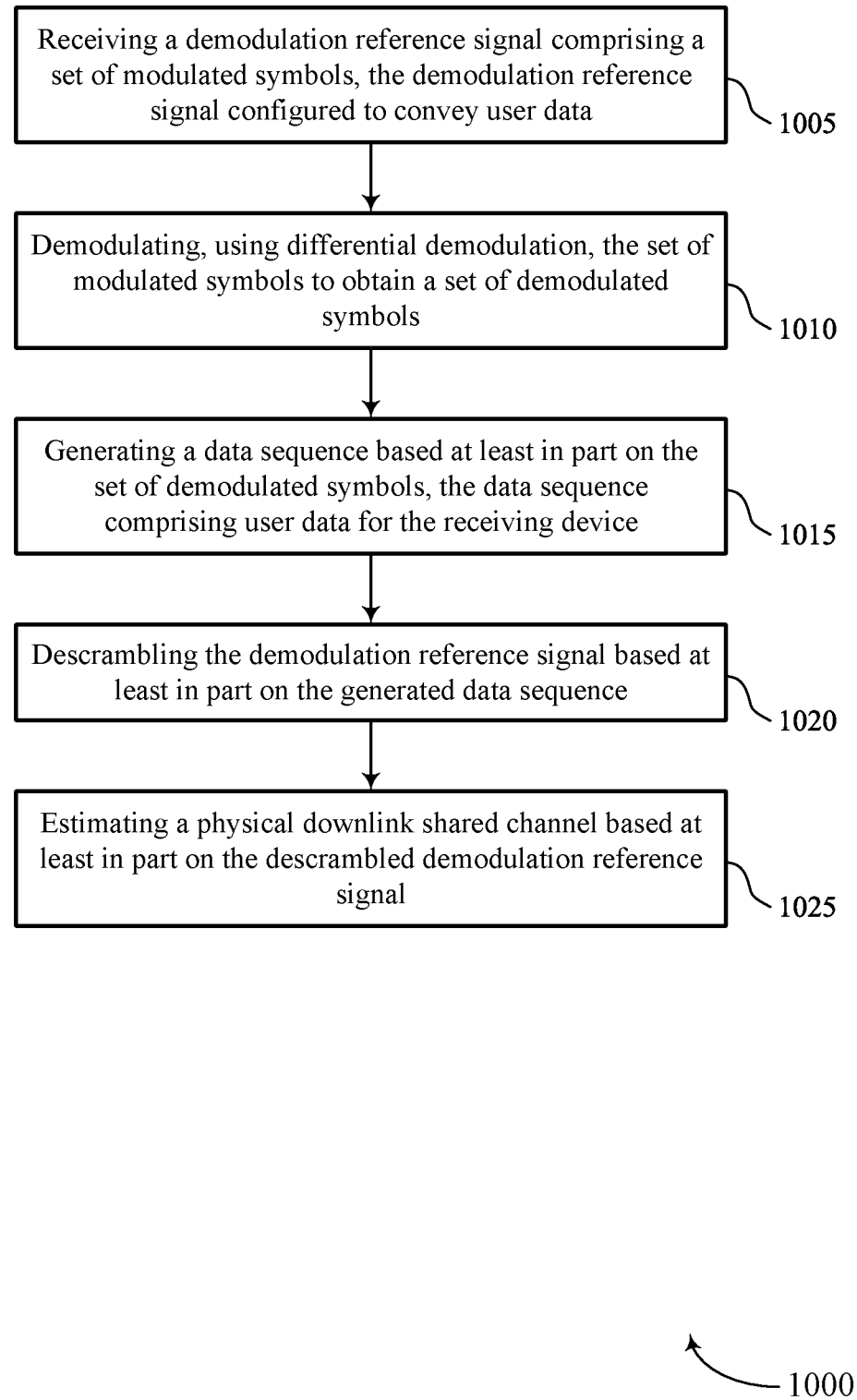
FIGS. 10 and 11 show flowcharts illustrating methods that support techniques for transmitting demodulation reference signals using noncoherent modulation in accordance with various aspects of the present disclosure.

FIG. 10 shows a flowchart illustrating a method for techniques for transmitting demodulation reference signals using noncoherent modulation in accordance with various aspects of the present disclosure. The operations of method 1000 may be implemented by a UE or a base station or its components as described herein. For example, the operations of method 1000 may be performed by a UE 115 or a base station 105 as described with reference to FIGS. 1 through 9. In some examples, a UE or a base station may execute a set of instructions to control the functional elements of the device to perform the described functions. Additionally, or alternatively, the UE or the base station may perform aspects of the described functions using special-purpose hardware.

At 1005, the method may include receiving a demodulation reference signal comprising a set of modulated symbols, the demodulation reference signal configured to convey user data. The operations of 1005 may be performed according to the methods described herein. In some examples, aspects of the operations of 1005 may be performed by a reference signal component 725 as described with reference to FIG. 7.

At 1010, the method may include demodulating, using differential demodulation, the set of modulated symbols to obtain a set of demodulated symbols. The operations of 1010 may be performed according to the methods described herein. In some examples, aspects of the operations of 1010 may be performed by a demodulation component 730 as described with reference to FIG. 7.

At 1015, the method may include generating a data sequence based at least in part on the set of demodulated symbols, the data sequence comprising user data for the receiving device. The operations of 1015 may be performed according to the methods described herein. In some examples, aspects of the operations of 1015 may be performed by a data component 735 as described with reference to FIG. 7.

At 1020, the method may include descrambling the demodulation reference signal based at least in part on the generated data sequence. The operations of 1020 may be performed according to the methods described herein. In some examples, aspects of the operations of 1020 may be performed by a descrambling component 740 as described with reference to FIG. 7.

At 1025, the method may include estimating a physical shared channel based at least in part on the descrambled demodulation reference signal. The operations of 1025 may be performed according to the methods described herein. In some examples, aspects of the operations of 1025 may be performed by an estimation component 745 as described with reference to FIG. 7.

Figure 11:
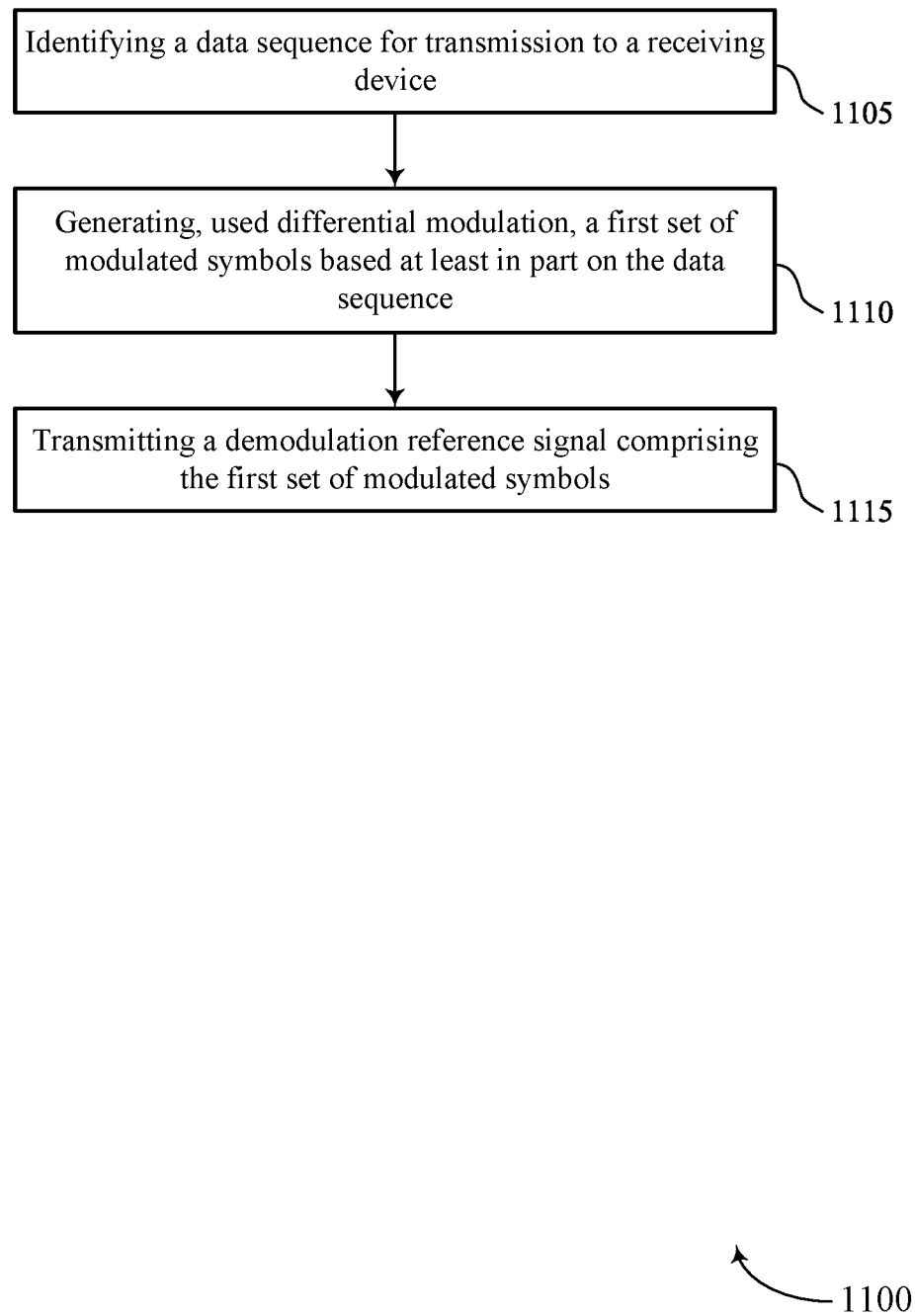

FIG. 11 shows a flowchart illustrating a method for techniques for transmitting demodulation reference signals using noncoherent modulation in accordance with various aspects of the present disclosure. The operations of method 1100 may be implemented by a UE or a base station or its components as described herein. For example, the operations of method 1100 may be performed by a UE 115 or a base station 105 as described with reference to FIGS. 1 through 9. In some examples, a UE or a base station may execute a set of instructions to control the functional elements of the device to perform the described functions. Additionally, or alternatively, the UE or the base station may perform aspects of the described functions using special-purpose hardware.

At 1105, the method may include identifying a data sequence for transmission to a receiving device. The operations of 1105 may be performed according to the methods described herein. In some examples, aspects of the operations of 1105 may be performed by a data component 735 as described with reference to FIG. 7.

At 1110, the method may include generating, using differential modulation, a first set of modulated symbols based at least in part on the data sequence. The operations of 1110 may be performed according to the methods described herein. In some examples, aspects of the operations of 1110 may be performed by a modulation component 750 as described with reference to FIG. 7.

At 1115, the method may include transmitting a demodulation reference signal comprising the first set of modulated symbols. The operations of 1115 may be performed according to the methods described herein. In some examples, aspects of the operations of 1115 may be performed by a reference signal component 725 as described with reference to FIG. 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a receiving device, comprising:
    receiving a demodulation reference signal comprising a set of modulated symbols, the demodulation reference signal configured to convey user data for the receiving device;
    demodulating, using differential demodulation, the set of modulated symbols to obtain, from the demodulation reference signal, a set of demodulated symbols representing the user data for the receiving device;
    generating a data sequence based at least in part on the set of demodulated symbols, the data sequence comprising the user data for the receiving device;
    descrambling the demodulation reference signal based at least in part on the generated data sequence; and
    estimating a physical downlink shared channel based at least in part on the descrambled demodulation reference signal.

2. The method of claim 1, wherein descrambling the demodulation reference signal based at least in part on the generated data sequence comprises:
    encoding the generated data sequence to obtain a second data sequence; and
    modulating the second data sequence using differential modulation to obtain a second set of modulated symbols, wherein the demodulation reference signal is descrambled using the second set of modulated symbols.

3. The method of claim 1, wherein generating the data sequence comprises:
    decoding the set of demodulated symbols to obtain the data sequence; and
    checking the data sequence for errors based at least in part on a set of cyclic redundancy check bits included in the data sequence.

4. The method of claim 3, wherein the set of demodulated symbols is decoded in accordance with a low density parity check code, a turbo code, a polar code, or a convolutional code.

5. The method of claim 3, further comprising:
    transmitting acknowledgment feedback for the data sequence indicating whether errors were detected in the data sequence based at least in part on the set of cyclic redundancy check bits.

6. The method of claim 5, further comprising:
    demodulating a second demodulation reference signal comprising a second set of demodulated symbols that is a repetition of the set of demodulated symbols based at least in part on transmitting acknowledgment feedback indicating that an error was detected in the data sequence.

7. The method of claim 1, further comprising:
    receiving a first component of the demodulation reference signal transmitted from a first antenna port using communication resources and a second component of the demodulation reference signal transmitted from a second antenna port using the same communication resources.

8. The method of claim 7, wherein the first component of the demodulation reference signal comprises first data and is transmitted from the first antenna port using a first spatial layer and the second component of the demodulation reference signal comprises second data and is transmitted from the second antenna port using a second spatial layer, the method further comprising:
    extracting the first data from the first component of the demodulation reference signal and the second data from the second component of the demodulation reference signal, wherein the data sequence comprises the first data and the second data.

9. The method of claim 7, wherein the first component of the demodulation reference signal comprises first data and is transmitted from the first antenna port using a first spatial layer and the second component of the demodulation reference signal comprises the first data and is transmitted from the second antenna port using the first spatial layer, the method further comprising:
    extracting the first data from the first component of the demodulation reference signal and the second component of the demodulation reference signal, wherein the data sequence comprises the first data.

10. The method of claim 7, further comprising:
separating the first component of the demodulation reference signal from the second component of the demodulation reference signal based at least in part on a plurality of orthogonal cover codes.

11. The method of claim 1, wherein the demodulation reference signal is received using a first set of communication resources, the method further comprising:
receiving, using a second set of communication resources, a data signal including a second set of modulated symbols.

12. The method of claim 11, wherein the set of modulated symbols of the demodulation reference signal are demodulated using differential phase shift keying and the second set of modulated symbols of the data signal are demodulated using coherent demodulation.

13. The method of claim 11, further comprising:
demodulating, using coherent modulation, the second set of modulated symbols received in the data signal to obtain a second set of demodulated symbols based at least in part on the estimated physical downlink shared channel;
generating a second data sequence based at least in part on the second set of demodulated symbols; and
combining the data sequence and the second data sequence to obtain a combined data sequence.

14. The method of claim 13, further comprising:
checking the combined data sequence for errors based at least in part on a set of cyclic redundancy check bits included in the combined data sequence.

15. The method of claim 11, further comprising:
receiving a first indication of a difference between a first modulation and coding scheme level used for the demodulation reference signal and a second modulation and coding scheme level used for the data signal, a second indication of a maximum modulation and coding scheme level for the demodulation reference signal, a third indication that a communication mode that supports demodulation reference signals carrying data is enabled, or any combination thereof.

16. The method of claim 15, wherein the first indication, the second indication, the third indication, or any combination thereof is received in downlink control information, radio resource control information, or any combination thereof.

17. The method of claim 11, further comprising:
transmitting a first indication of a difference between a first modulation and coding scheme level used for the demodulation reference signal and a second modulation and coding scheme level used for the data signal, a second indication of a maximum modulation and coding scheme level for the demodulation reference signal, a third indication that a communication mode that supports demodulation reference signals carrying data is enabled, or any combination thereof.

18. The method of claim 11, wherein the demodulation reference signal and the data signal are received in a time interval, the method further comprising:
receiving, after the demodulation reference signal, a second demodulation reference signal in the time interval, the second demodulation reference signal comprising a pseudorandom sequence.

19. The method of claim 1, further comprising:
determining that the demodulation reference signal carries data based at least in part on one or more channel characteristics exceeding a threshold.

20. A method for wireless communication at a transmitting system, comprising:
identifying a data sequence for transmission to a receiving device;
modulating, using differential modulation, a portion of the data sequence to obtain a first set of modulated symbols; and
transmitting a demodulation reference signal comprising the first set of modulated symbols.

21. The method of claim 20, further comprising:
encoding the portion of the data sequence in accordance with a low density parity check code, a turbo code, a polar code, or a convolutional code, wherein the first set of modulated symbols are obtained based at least in part on the encoded portion of the data sequence.

22. The method of claim 20, further comprising:
generating a set of cyclic redundancy check bits based at least in part on the portion of the data sequence used to obtain the first set of modulated symbols, wherein the first set of modulated symbols comprises the portion of the data sequence and the set of cyclic redundancy check bits.

23. The method of claim 22, further comprising:
receiving acknowledgment feedback indicating that an error was detected in a second data sequence conveyed by the demodulation reference signal based at least in part on the set of cyclic redundancy check bits; and
transmitting a second demodulation reference signal comprising a second set of modulated symbols including the portion of the data sequence and the set of cyclic redundancy check bits.

24. The method of claim 20, wherein transmitting the demodulation reference signal comprises:
transmitting, using a first antenna port, a first component of the demodulation reference signal over communication resources in accordance with a first orthogonal cover code of a plurality of orthogonal cover codes; and
transmitting, using a second antenna port, a second component of the demodulation reference signal over the same communication resources in accordance with a second orthogonal cover code of the plurality of orthogonal cover codes.

25. The method of claim 24, wherein transmitting the demodulation reference signal comprises:
transmitting the first component of the demodulation reference signal over a first spatial layer, the first component of the demodulation reference signal comprising the portion of the data sequence; and
transmitting the second component of the demodulation reference signal over a second spatial layer, the second component of the demodulation reference signal comprising a second portion of the data sequence.

26. The method of claim 20, further comprising:
generating, using coherent modulation, a second set of modulated symbols based at least in part on the data sequence; and
transmitting, concurrently with the demodulation reference signal, a data signal comprising the second set of modulated symbols, wherein the demodulation reference signal is transmitted in accordance with a first modulation and coding scheme level and the data signal is transmitted in accordance with a second modulation and coding scheme level.

27. An apparatus for wireless communication at a receiving device, comprising:
a processor;
memory coupled with the processor; and
instructions stored in the memory and executable by the processor to cause the apparatus to:
receive a demodulation reference signal comprising a set of modulated symbols, the demodulation reference signal configured to convey user data for the receiving device;
demodulate, using differential demodulation, the set of modulated symbols to obtain, from the demodulation reference signal, a set of demodulated symbols representing the user data for the receiving device;
generate a data sequence based at least in part on the set of demodulated symbols, the data sequence comprising the user data for the receiving device;
descramble the demodulation reference signal based at least in part on the generated data sequence; and
estimate a physical downlink shared channel based at least in part on the descrambled demodulation reference signal.

28. The apparatus of claim 27, wherein the instructions to descramble the demodulation reference signal are further executable by the processor to cause the apparatus to:
encode the generated data sequence to obtain a second data sequence; and
modulate the second data sequence using differential modulation to obtain a second set of modulated symbols, wherein the demodulation reference signal is descrambled using the second set of modulated symbols.

29. An apparatus for wireless communication at a transmitting system, comprising:
a processor;
memory coupled with the processor; and
instructions stored in the memory and executable by the processor to cause the apparatus to:
identify a data sequence for transmission to a receiving device;
modulate, using differential modulation, a portion of the data sequence to obtain a first set of modulated symbols; and
transmit a demodulation reference signal comprising the first set of modulated symbols.

30. The apparatus of claim 29, wherein the instructions to descramble the demodulation reference signal are further executable by the processor to cause the apparatus to:
encode the portion of the data sequence in accordance with a low density parity check code, a turbo code, a polar code, or a convolutional code, wherein the first set of modulated symbols are obtained based at least in part on the encoded portion of the data sequence.

* * * * *